United States Patent
Cordova et al.

(10) Patent No.: US 10,455,361 B2
(45) Date of Patent: *Oct. 22, 2019

(54) SYSTEMS AND METHODS FOR DETECTING AND ASSESSING DISTRACTED DRIVERS

(71) Applicant: TRUEMOTION, INC., Boston, MA (US)

(72) Inventors: Brad Cordova, Cambridge, MA (US); Rafi Finegold, Cambridge, MA (US); Dan Shiebler, Boston, MA (US); Kevin Farrell, Windham, NH (US)

(73) Assignee: TRUEMOTION, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,694

(22) Filed: Nov. 1, 2018

(65) Prior Publication Data
US 2019/0116463 A1 Apr. 18, 2019

Related U.S. Application Data

(63) Continuation of application No. 15/268,049, filed on Sep. 16, 2016, now Pat. No. 10,158,977.
(Continued)

(51) Int. Cl.
*H04W 4/02* (2018.01)
*H04L 12/26* (2006.01)
(Continued)

(52) U.S. Cl.
CPC ............ *H04W 4/027* (2013.01); *B60W 40/09* (2013.01); *H04L 43/16* (2013.01); *H04L 67/22* (2013.01);
(Continued)

(58) Field of Classification Search
CPC ......... H04L 43/16; H04L 12/26; H04L 67/22; H04M 1/00; H04M 3/00; H04M 2250/10;
(Continued)

(56) References Cited

U.S. PATENT DOCUMENTS 7,209,886 B2    4/2007    Kimmel et al.
8,117,049 B2    2/2012    Berkobin et al.
(Continued)

FOREIGN PATENT DOCUMENTS

EP    3091498 A1    11/2016
WO    2012097441 A1    7/2012
(Continued)

OTHER PUBLICATIONS

U.S. Appl. No. 14/139,510, "Non-Final Office Action", dated Jul. 9, 2015, 13 pages.
(Continued)

*Primary Examiner* — Meless N Zewdu
(74) *Attorney, Agent, or Firm* — Kilpatrick Townsend & Stockton LLP

(57) ABSTRACT

Embodiments of the present invention meet this need and others by providing systems and methods for detecting and assessing distracted drivers. Embodiments collect vehicle and driving data using a mobile device of a user. In a particular embodiment, data collected using the mobile device is analyzed to determine when the user is engaging in distracted driving behavior.

17 Claims, 20 Drawing Sheets

Related U.S. Application Data

(60) Provisional application No. 62/219,989, filed on Sep. 17, 2015, provisional application No. 62/318,983, filed on Apr. 6, 2016, provisional application No. 62/353,455, filed on Jun. 22, 2016.

(51) Int. Cl.

| | |
|---|---|
| H04M 1/00 | (2006.01) |
| H04M 3/00 | (2006.01) |
| H04W 64/00 | (2009.01) |
| H04W 4/04 | (2009.01) |
| H04W 4/40 | (2018.01) |
| B60W 40/09 | (2012.01) |
| H04L 29/08 | (2006.01) |
| H04M 1/725 | (2006.01) |
| B60W 50/12 | (2012.01) |
| G01S 19/00 | (2010.01) |

(52) U.S. Cl.
CPC .............. *H04M 1/00* (2013.01); *H04M 3/00* (2013.01); *H04W 4/023* (2013.01); *H04W 4/046* (2013.01); *H04W 4/40* (2018.02); *H04W 64/00* (2013.01); *B60W 50/12* (2013.01); *G01S 19/00* (2013.01); *H04M 1/72577* (2013.01); *H04M 2250/10* (2013.01); *H04W 4/026* (2013.01)

(58) Field of Classification Search
CPC .. H04M 1/72577; H04M 15/20; H04M 15/22; H04W 4/04; H04W 4/025; H04W 4/06; H04W 4/07; H04W 4/28; H04W 4/046; H04W 60/00; H04W 24/10; H04W 88/02; H04W 4/38; H04W 4/44; H04W 4/48; H04W 64/00; H04W 4/40; H04W 4/027; H04W 4/02; H04W 4/023; H04W 88/00; H04W 4/00; H04W 4/026; G01C 21/00; B60W 40/09; B60W 40/10; B60W 50/14; B60W 2540/28; B60W 50/12; G01S 19/00

See application file for complete search history.

(56) References Cited

U.S. PATENT DOCUMENTS

| | | | |
|---|---|---|---|
| 8,140,358 B1 | 3/2012 | Ling et al. | |
| 8,165,916 B2 | 4/2012 | Hoffberg et al. | |
| 8,284,039 B2 | 10/2012 | Baker et al. | |
| 8,285,439 B2 | 10/2012 | Hodges et al. | |
| 8,296,007 B2 | 10/2012 | Swaminathan et al. | |
| 8,311,858 B2 | 11/2012 | Everett et al. | |
| 8,527,013 B2 | 9/2013 | Guba et al. | |
| 8,595,034 B2 | 11/2013 | Bauer et al. | |
| 8,862,486 B2 | 10/2014 | Cordova et al. | |
| 9,055,407 B1* | 6/2015 | Riemer et al. | H04W 4/027 |
| 9,141,995 B1 | 9/2015 | Brinkmann et al. | |
| 9,936,358 B2* | 4/2018 | Gruteser et al. | |
| 10,042,364 B1* | 8/2018 | Hayward | G05D 1/0278 |
| 10,072,932 B2 | 9/2018 | Cordova et al. | |
| 10,158,977 B2 | 12/2018 | Cordova et al. | |
| 2004/0236596 A1 | 11/2004 | Chowdhary et al. | |
| 2004/0252027 A1 | 12/2004 | Torkkola et al. | |
| 2007/0136107 A1 | 6/2007 | Maguire et al. | |
| 2008/0065427 A1 | 3/2008 | Helitzer et al. | |
| 2008/0154629 A1 | 6/2008 | Breed et al. | |
| 2009/0043449 A1 | 2/2009 | Matsuura et al. | |
| 2009/0197619 A1 | 8/2009 | Colligan et al. | |
| 2009/0216704 A1 | 8/2009 | Zheng et al. | |
| 2010/0049398 A1* | 2/2010 | Bryant et al. | 701/29 |
| 2010/0131304 A1 | 5/2010 | Collopy et al. | |
| 2010/0205012 A1 | 8/2010 | McClellan et al. | |
| 2010/0292921 A1 | 11/2010 | Zachariah et al. | |
| 2011/0012759 A1 | 1/2011 | Yin | |
| 2011/0112759 A1 | 5/2011 | Bast et al. | |
| 2011/0125394 A1 | 5/2011 | Horstemeyer | |
| 2011/0153367 A1 | 6/2011 | Amigo et al. | |
| 2011/0237219 A1 | 9/2011 | Mendenhall et al. | |
| 2011/0275321 A1 | 11/2011 | Zhou et al. | |
| 2011/0294520 A1 | 12/2011 | Zhou et al. | |
| 2012/0028624 A1 | 2/2012 | Jedlicka | |
| 2012/0066251 A1 | 3/2012 | Gontmakher et al. | |
| 2012/0071151 A1 | 3/2012 | Abramson et al. | |
| 2012/0072244 A1 | 3/2012 | Collins et al. | |
| 2012/0088462 A1 | 4/2012 | Mader et al. | |
| 2012/0150651 A1 | 6/2012 | Hoffberg et al. | |
| 2012/0197669 A1 | 8/2012 | Kote et al. | |
| 2012/0209634 A1 | 8/2012 | Ling et al. | |
| 2012/0214463 A1 | 8/2012 | Smith et al. | |
| 2012/0289217 A1* | 11/2012 | Riemer et al. | 455/418 |
| 2012/0296885 A1 | 11/2012 | Gontmakher et al. | |
| 2012/0303392 A1 | 11/2012 | Depura et al. | |
| 2012/0310587 A1 | 12/2012 | Tu et al. | |
| 2012/0316913 A1 | 12/2012 | Reyes | |
| 2013/0006674 A1 | 1/2013 | Bowne et al. | |
| 2013/0046562 A1 | 2/2013 | Taylor et al. | |
| 2013/0238241 A1 | 9/2013 | Chelotti et al. | |
| 2013/0297097 A1* | 11/2013 | Fischer et al. | G06F 17/00 |
| 2014/0108058 A1 | 4/2014 | Bourne et al. | |
| 2014/0149145 A1 | 5/2014 | Peng et al. | |
| 2014/0180730 A1 | 6/2014 | Cordova et al. | |
| 2014/0180731 A1 | 6/2014 | Cordova et al. | |
| 2014/0222253 A1 | 8/2014 | Siegel et al. | |
| 2014/0324745 A1 | 10/2014 | Leppanen et al. | |
| 2014/0370919 A1 | 12/2014 | Cordova et al. | |
| 2015/0019266 A1 | 1/2015 | Stempora | |
| 2015/0087264 A1* | 3/2015 | Goyal | H04W 12/08 |
| 2015/0091740 A1* | 4/2015 | Bai et al. | B60W 40/08 |
| 2015/0156567 A1* | 6/2015 | Oliver et al. | H04Q 9/00 |
| 2015/0170030 A1 | 6/2015 | Maennel | |
| 2015/0186714 A1 | 7/2015 | Ren et al. | |
| 2015/0296334 A1 | 10/2015 | Smyrk et al. | |
| 2016/0046298 A1 | 2/2016 | Deruyck et al. | |
| 2016/0051167 A1 | 2/2016 | Saha et al. | |
| 2016/0066155 A1 | 3/2016 | Fan et al. | |
| 2016/0127486 A1 | 5/2016 | Chen et al. | |
| 2016/0205238 A1* | 7/2016 | Abramson et al. | H04M 1/72577 |
| 2016/0327397 A1 | 11/2016 | Cordova et al. | |
| 2016/0379141 A1 | 12/2016 | Judge et al. | |
| 2017/0105098 A1 | 4/2017 | Cordova et al. | |
| 2017/0142556 A1 | 5/2017 | Matus | |
| 2017/0210290 A1 | 7/2017 | Cordova et al. | |
| 2017/0243508 A1* | 8/2017 | Cheng et al. | G09B 19/00 |
| 2017/0349182 A1 | 12/2017 | Cordova et al. | |
| 2018/0035382 A1* | 2/2018 | Fenseca Montero et al. | H04W 52/0254 |

FOREIGN PATENT DOCUMENTS

| | | |
|---|---|---|
| WO | 2014105846 A2 | 7/2014 |
| WO | 2014105846 A3 | 7/2014 |
| WO | 2017049137 A1 | 3/2017 |

OTHER PUBLICATIONS

U.S. Appl. No. 14/139,510, "Notice of Allowance", dated Mar. 28, 2016, 10 pages.
U.S. Appl. No. 14/192,452, "Non Final Office Action", dated Apr. 25, 2014, 10 pages.
U.S. Appl. No. 14/192,452, "Notice of Allowance", dated Jun. 10, 2014, 13 pages.
U.S. Appl. No. 15/149,628, "Final Office Action", dated Nov. 20, 2017, 26 pages.
U.S. Appl. No. 15/149,628, "Non-Final Office Action", dated May 5, 2017, 19 pages.
U.S. Appl. No. 15/149,628, "Notice of Allowance", dated May 10, 2018, 12 pages.
U.S. Appl. No. 15/268,049, "Final Office Action", dated Apr. 17, 2018, 13 pages.

(56) References Cited

OTHER PUBLICATIONS

U.S. Appl. No. 15/268,049, "Non-Final Office Action", dated Oct. 5, 2017, 13 pages.
U.S. Appl. No. 15/268,049, "Notice of Allowance", dated Aug. 1, 2018, 9 pages.
U.S. Appl. No. 15/413,005, "Final Office Action", dated Feb. 1, 2018, 16 pages.
U.S. Appl. No. 15/413,005, "Non-Final Office Action", dated Jun. 16, 2017, 16 pages.
Beljecki, et al., "Transportation mode-based segmentation and classification of movement trajectories", International Journal of Geographical Information Science, vol. 27, Issue 2, Oct. 19, 2012, pp. 1-28.
EP16168772.8, "Extended European Search Report", dated Aug. 31, 2016, 9 pages.
PCT/US2013/077544, "International Search Report and Written Opinion", dated Aug. 5, 2014, 11 pages.
PCT/US2016/052210, "International Search Report and Written Opinion", dated Nov. 29, 2016, 9 pages.
Stenneth, et al., "Transportation Mode Detection using Mobile Phones and GIS Information", ACM SIGSPATIAL GIS, Nov. 1, 2011, pp. 54-63.
EP16847426.0, "Extended European Search Report", dated Feb. 26, 2019, 15 pages.
U.S. Appl. No. 15/413,005, "Final Office Action", dated May 30, 2019, 22 pages.

\* cited by examiner

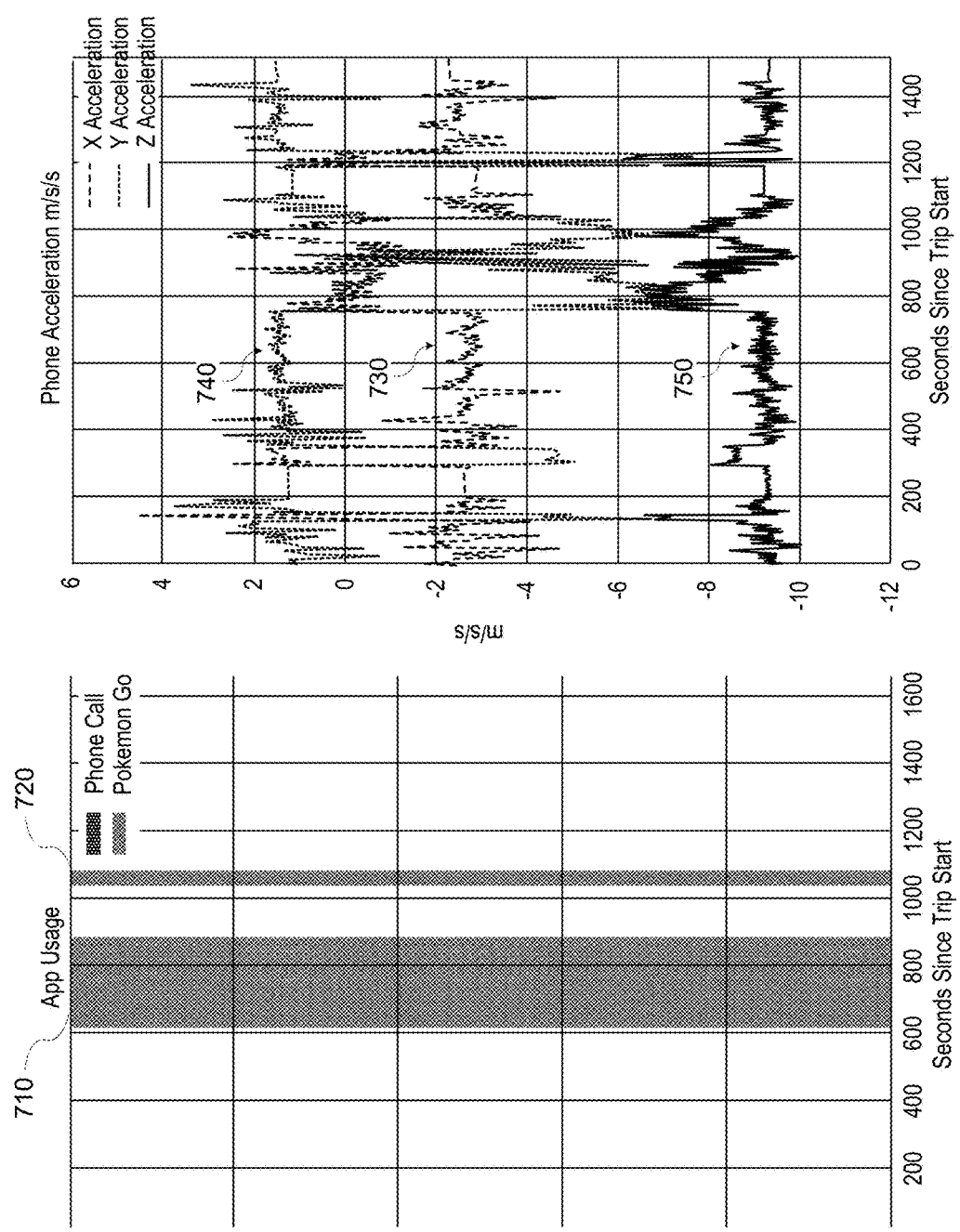

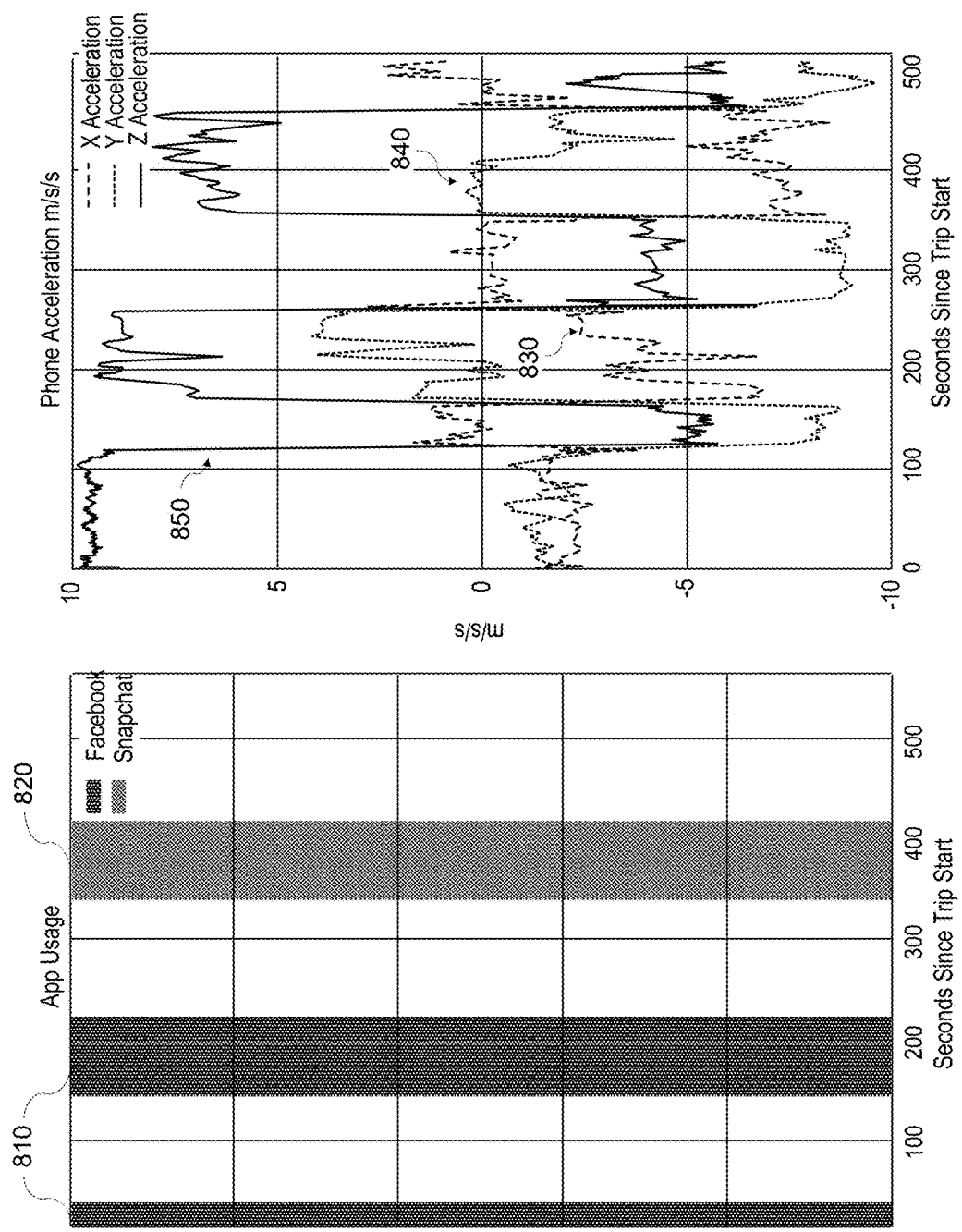

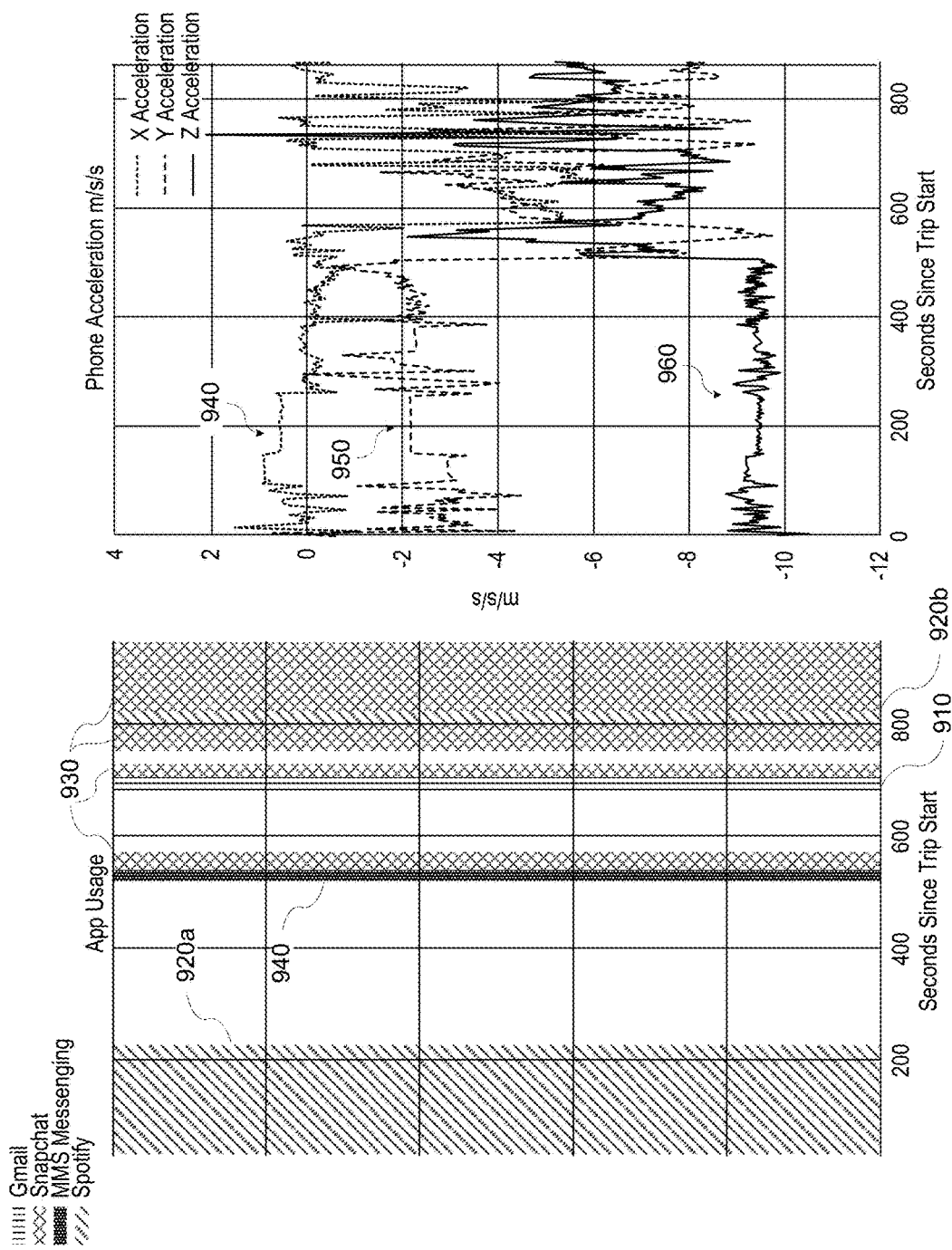

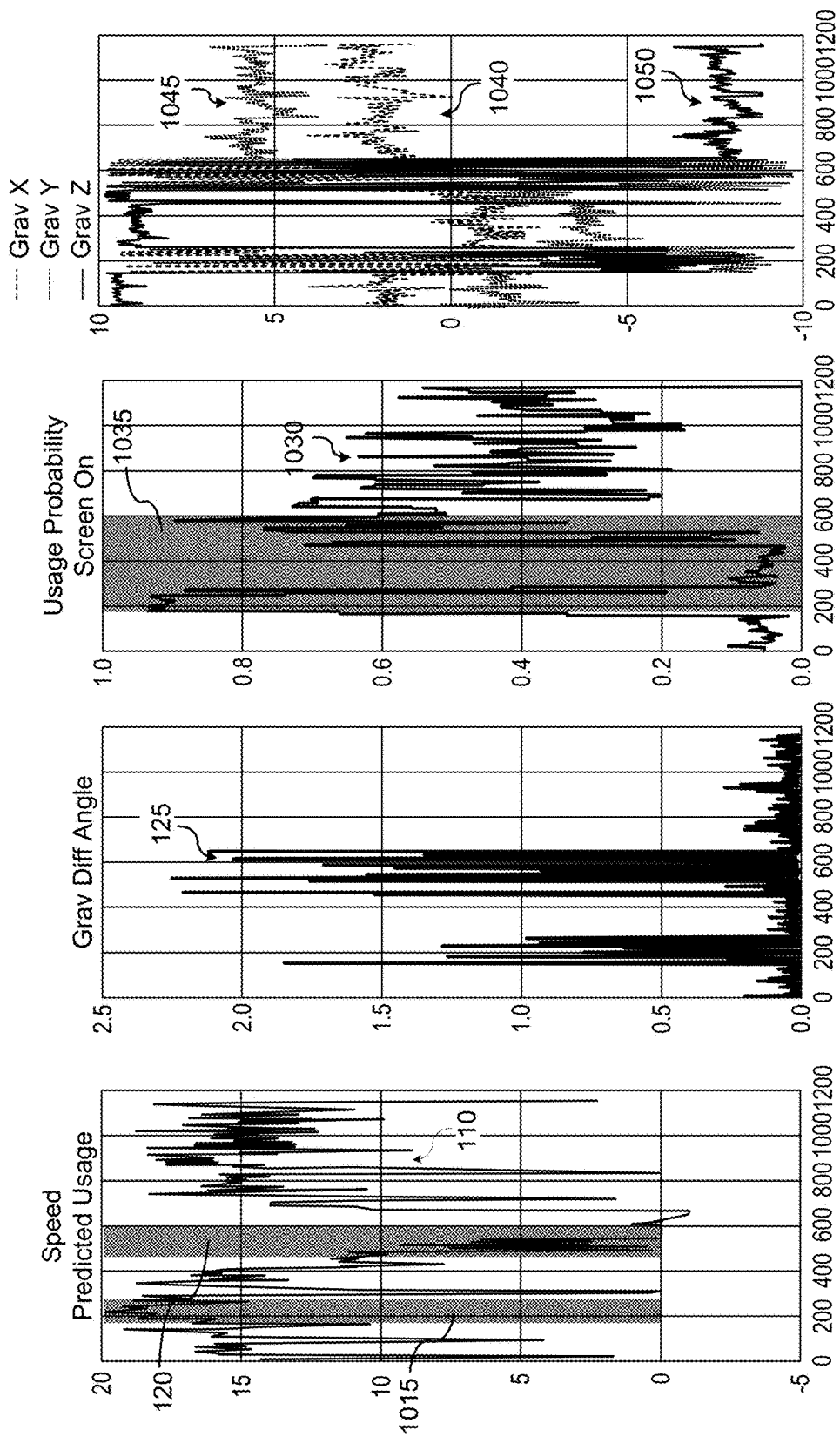

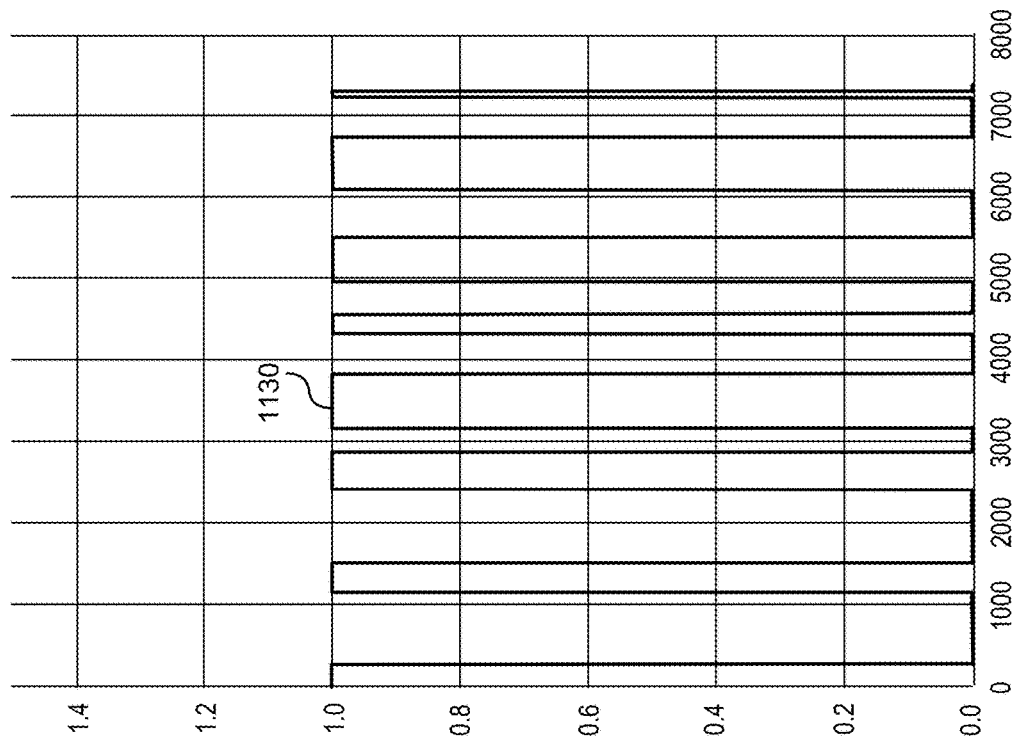
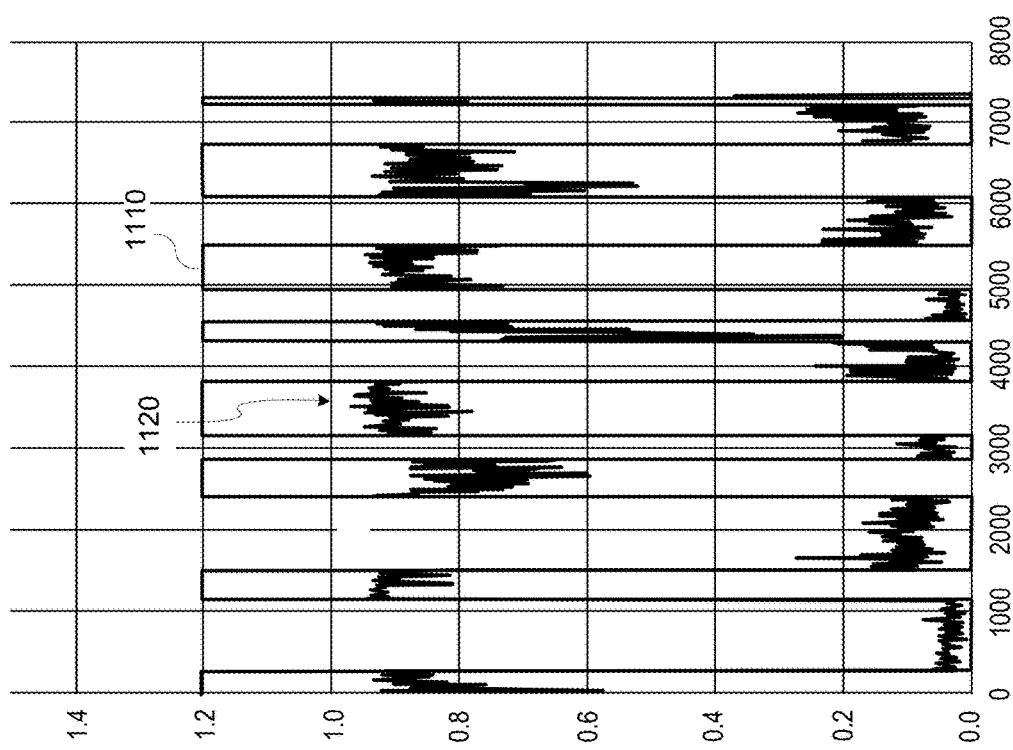

SYSTEMS AND METHODS FOR DETECTING AND ASSESSING DISTRACTED DRIVERS

CROSS-REFERENCES TO RELATED APPLICATIONS

This application is a continuation application of U.S. patent application Ser. No. 15/268,049, filed on Sep. 16, 2016, now U.S. Pat. No. 10,158,977, issued on Dec. 18, 2018, entitled "SYSTEMS AND METHODS FOR DETECTING AND ASSESSING DISTRACTED DRIVERS," which claims priority to U.S. Provisional Patent Application No. 62/219,989, filed on Sep. 17, 2015, entitled "METHODS AND SYSTEMS FOR DETECTING AND ASSESSING DISTRACTED DRIVERS," U.S. Provisional Patent Application No. 62/318,983, filed on Apr. 6, 2016, entitled "SYSTEMS AND METHODS FOR DETECTING DEVICE USAGE," and U.S. Provisional Patent Application No. 62/353,455, filed on Jun 22, 2016,entitled "SYSTEMS AND METHODS FOR DETECTING DEVICE USAGE," the disclosures of which are hereby incorporated by reference in their entireties for all purposes.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

Some systems have been developed to track driving behaviors including speed, braking, and turn speed. For example, external devices that plug into an automobile's computer system have been integrated with vehicles to track driving behavior. One driving behavior of interest is a driver's inattention to tasks that are important to driving. One source of driver inattention is the use of a mobile device while driving.

SUMMARY OF THE INVENTION

Despite the progress made in relation to collecting data related to drivers and their driving behavior, there is a need in the art for improved systems and methods related to tracking and evaluating the inattention of drivers.

Embodiments of the present invention meet this need and others by providing systems and methods for detecting and assessing distracted drivers. Embodiments collect vehicle and driving data using a mobile device of a user. In a particular embodiment, data collected using the mobile device is analyzed to determine when the user is engaging in distracted driving behavior.

According to some embodiments of the present invention, a system is provided. The system includes a mobile device comprising a plurality of sensors, a memory, and a processor coupled to the memory. The processor is configured to perform operations including obtaining a plurality of movement measurements over a plurality of time intervals from at least one of the plurality of sensors in the mobile device of a user using a trip in a vehicle. The operations further include classifying a subset of the plurality of movement measurements as mobile device usage movements based on characteristics of the subset. The mobile device usage movements are indicative of usage of the mobile device by the user. The operations further include filtering the mobile device usage movements, and outputting the filtered mobile device usage movements.

According to some embodiments of the present invention, a method is provided. The method comprises obtaining a plurality of movement measurements over a plurality of time intervals from at least one of a plurality of sensors in a mobile device of a user during a trip in a vehicle. The method further comprises classifying a subset of the plurality of movement measurements as mobile device usage movements based on characteristics of the subset. The mobile device usage movements are indicative of usage of the mobile device by the user. The method further comprises filtering the mobile device usage movements, and outputting the filtered mobile device usage movements.

These and other embodiments of the invention along with many of their advantages and features are described in more detail in conjunction with the text below and attached figures.

BRIEF DESCRIPTION OF THE DRAWINGS

FIGS. 7A and 7B are graphs of actual mobile device usage intervals and accelerometer measurements during those intervals when a user is using an application and taking a phone call according to an embodiment of the present invention.

FIGS. 8A and 8B are graphs of actual mobile device usage intervals and accelerometer measurements during those intervals when a user is using two different applications according to an embodiment of the present invention.

FIGS. 9A and 9B are graphs of actual mobile device usage intervals and accelerometer measurements during those intervals when a user is using applications and text messaging according to an embodiment of the present invention.

FIGS. 10A-10D are plots of sensor measurements and predicted usage intervals according to an embodiment of the present invention.

FIG. 11A is a plot of predicted mobile device usage according to an embodiment of the present invention.

FIG. 11B is a plot of actual device usage according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the present invention utilize mobile devices to provide information on a user's behaviors during transportation. For example, a mobile device carried by a user could be used to analyze driving behavior. Important driving behaviors that can be identified by some embodiments are device usage behavior and device interaction or touch behavior, which is indicative of distraction or inattentiveness to one or more driving tasks. The driving tasks may include speed, speed limit, direction, school zones, other vehicles, and/or other critical driving tasks.

As discussed further herein, some embodiments described use approaches to collecting and analyzing driving data similar to the approaches described in U.S. patent application Ser. No. 15/149,603, filed May 9, 2016, now U.S. Pat. No. 10,067,157, issued on Sep. 4, 2018, entitled "METHODS AND SYSTEMS FOR SENSOR-BASED VEHICLE ACCELERATION DETERMINATION" ("the '603 application"), U.S. patent application Ser. No. 15/149,613, filed May 9, 2016, now U.S. Pat. No. 9,892,363, issued on Feb. 13, 2018, entitled "METHODS AND SYSTEMS FOR SENSOR-BASED DRIVING DATA COLLECTION" ("the '613 application"), U.S. patent application Ser. No. 14/749,232, filed Jun. 24, 2015, now U.S. Pat. No. 10,078,099, issued on Sep. 18, 2018, entitled "METHODS AND SYSTEMS FOR ALIGNING A MOBILE DEVICE TO A VEHICLE" ("the '232 application"), and U.S. patent application Ser. No. 15/249,967, filed Aug. 29, 2016, entitled "METHODS AND SYSTEMS FOR PRESENTING COLLECTED DRIVING DATA" ("the '967 application"), all of which are incorporated by reference herein in their entireties for all purposes (collectively "the Incorporated Applications"). Specific examples of the use of different embodiments disclosed in the Incorporated Applications are provided herein, although other approaches described in the Incorporated Applications may be implemented in conjunction with some embodiments of the present invention as well.

Figure 1:
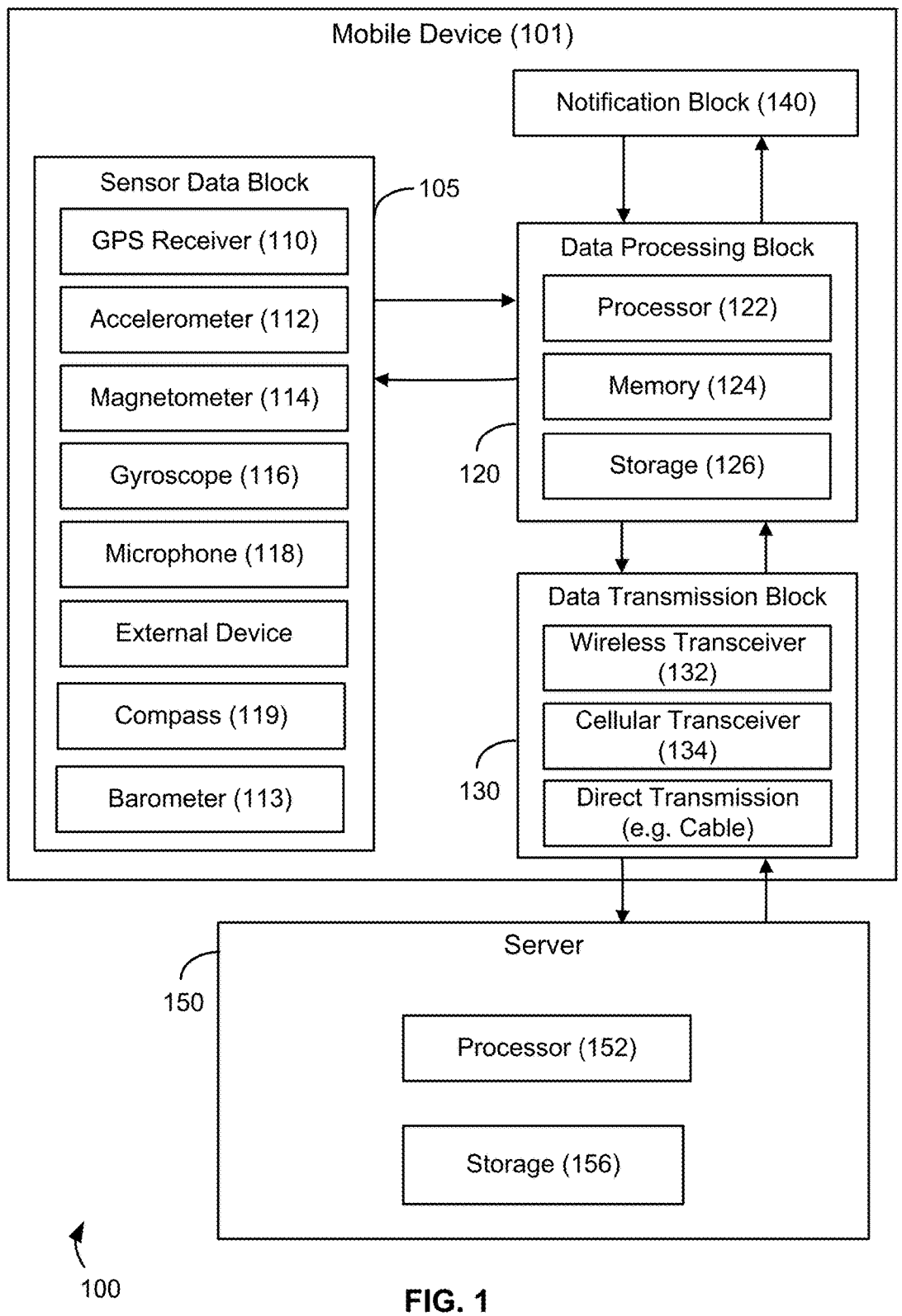
FIG. 1 is a system diagram illustrating a mobile device of a mobile device usage detection system according to an embodiment of the present invention.

FIG. 1 is a system diagram illustrating a system 100 for collecting driving data according to an embodiment of the present invention. System 100 includes a mobile device 101 having a number of different components. Mobile device 101 includes a sensor data block 105, a data processing block 120, a data transmission block 130, and a notification block 140. The sensor data block 105 includes data collection sensors as well as data collected from these sensors that are available to mobile device 101. This can include external devices connected via Bluetooth, USB cable, etc. The data processing block 120 includes storage 126, and manipulations done to the data obtained from the sensor data block 105 by processor 122. This includes, but is not limited to, analyzing, classifying, characterizing, subsampling, filtering, reformatting, etc. Data transmission block 130 includes any transmission of the data off the phone to an external computing device that can also store and manipulate the data obtained from sensor data block 105. The external computing device can be, for example, a server 150. Server 150 can comprise its own processor 152 and storage 156. In one embodiment, notification block 140 reports the results of analysis of sensor data performed by the data processing block 120 to a user of the mobile device 101 via a display (not shown). The functions of notification block 140 are described further in U.S. Provisional Patent Application No. 62/286,218, filed Jan. 22, 2016, which is herein incorporated by reference in its entirety.

Some embodiments of the present invention are described using examples where driving data is collected using mobile devices 101, and these examples are not limited to any particular mobile device. As examples, a variety of mobile devices including sensors such as accelerometers 112, gyroscopes 116, magnetometers 114, microphones 118, compasses 119, barometers 113, location determination systems such as global positioning system (GPS) receivers 110, communications capabilities, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) are operated close in time to a period when mobile device 101 is with a driver when operating a vehicle—also termed herein "a drive" or "a trip". With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple IOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. For some embodiments, the operating system of mobile device 101 can enable reporting of the screen state of mobile device 101 (i.e., whether the screen is on or off at a particular point in time).

Figure 2:
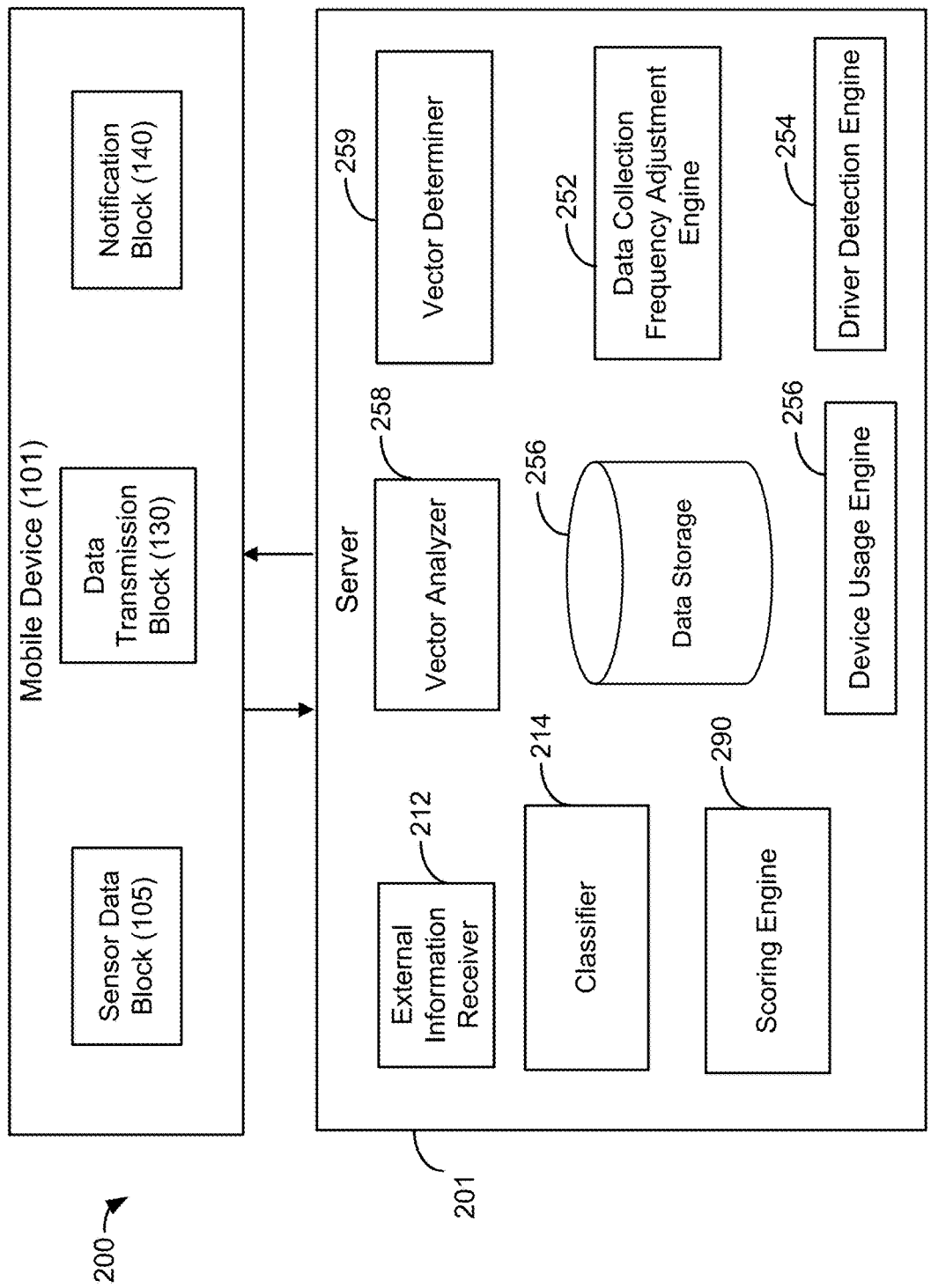
FIG. 2 is a system diagram illustrating a server of a mobile device usage detection system according to an embodiment of the present invention.

FIG. 2 shows a system 200 for collecting driving data that can include a server 201 that communicates with mobile device 101. In some embodiments, server 201 provides functionality using components including, but not limited to vector analyzer 258, vector determiner 259, external information receiver 212, classifier 214, data collection frequency engine 252, driver detection engine 254, scoring engine 290, and device usage engine 256. These components are executed by processors (not shown) in conjunction with memory (not shown). Server 201 also includes data storage 256. It is important to note that, while not shown, one or more of the components shown operating within server 201 can operate fully or partially within mobile device 101.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Examples of processes to detect and classify driving features using classifier 214, and determine acceleration vectors using vector analyzer 258 and vector determiner 259. In one embodiment, external data (e.g., weather) can be retrieved and correlated with collected driving data.

As discussed herein, some embodiments can transform collected sensor data (e.g., driving data collected using sensor data block 105) into different results, including, but not limited to, estimates of the occurrence of times where a driver was using the device. Such functions may be performed by device usage engine 256, for example. Examples of collecting driving data using sensors of a mobile device are described herein. Examples of analyzing collected driving data to detect the occurrence of device usage are also described herein. Notifications of driving events can be made via notification block 140 of mobile device 101 in one embodiment.

As discussed further in U.S. Provisional Patent Application No. 62/286,218 and U.S. Provisional Patent Application No. 62/346,013, herein incorporated by reference in their entireties, some embodiments analyze collected driving data and assign scores based on different criteria. Some embodiments use scoring engine 290 to analyze relevant data and rules, and generate scores for embodiments.

Although shown and described as being contained within server 201, it is contemplated that any or all of the components of server 201 may instead be implemented within mobile device 101. It is further contemplated that any or all of the functionalities described herein may be performed during a drive, in real time, or after a drive.

Figure 3:
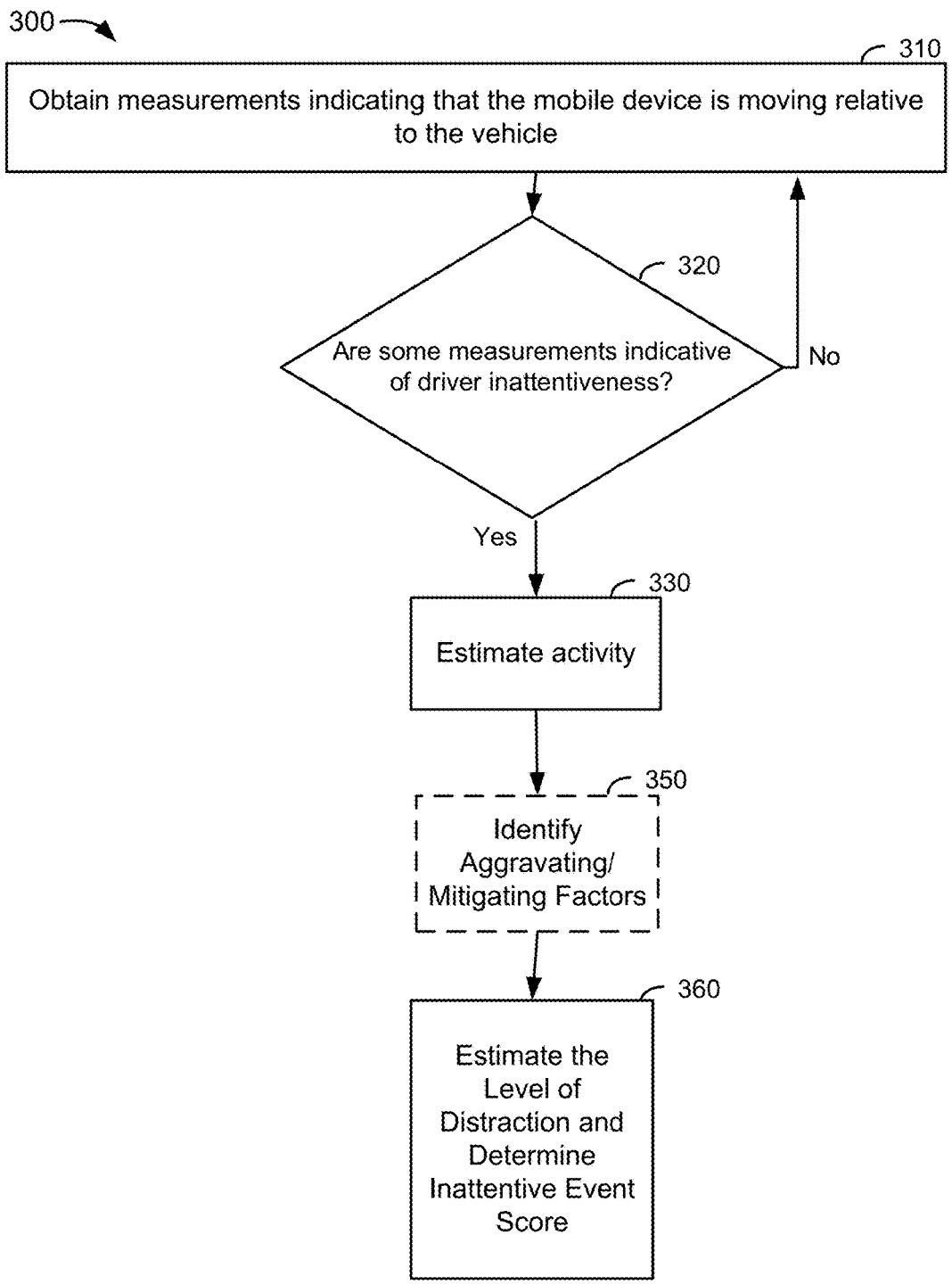
FIG. 3 is a flowchart illustrating the capture, analysis and use of attentiveness data associated with a driver according to an embodiment of the present invention.

FIG. 3 is a flowchart 300 of the capture, analysis and use of attentiveness data associated with a driver according to an embodiment of the present invention. The method described in FIG. 3 can use, for example, approaches described in the Incorporated Applications to detect and measure the movement of a mobile device relative to a moving vehicle.

As described within the Incorporated Applications, this detection, measurement, and analysis of the movement of a mobile device can be accomplished by collecting and storing sensor data from the mobile device (e.g., from sensors in sensor data block 105), then analyzing the data at server 201 (e.g., using vector analyzer 258, vector determiner 259, and/or classifier 214). In some embodiments, this analysis can additionally or alternatively be performed using resources in the mobile device (e.g., data processing block 120 in mobile device 101).

At processing block 310, measurements are obtained indicating that the mobile device is moving relative to the vehicle. In different examples, a measured movement can be minor (e.g., a mobile device sliding sideways within a cup holder), or more substantial (e.g., the mobile device being picked up out of the cup holder and held to the ear of a driver).

At decision block 320, the movement measurements are analyzed to determine whether they are indicative of a particular type of event (e.g., driver inattentiveness) occurring with respect to mobile device 101 in a vehicle. In some embodiments, this particular type of event is associated with use by the driver of mobile device 101 such that the driver of the vehicle is potentially not paying attention to driving tasks (e.g., the driver is distracted from driving tasks by mobile device 101). For convenience, as used herein, inattentiveness, distraction, failing to pay attention, and/or other similar terms and phrases broadly signify a driver not paying proper attention to tasks associated with operating the vehicle.

It is important to note that, for any analysis described herein, exclusions, thresholds and other limitations can be applied to allow for tuning of results. For example, certain types of applications (e.g., navigation applications, hands free phone calls) can be excluded in some embodiments from being assessed as distracting. In addition, a threshold can be applied to different analysis (e.g., a certain amount of movements must be detected to conclude a mobile device is being used).

As discussed below, not all movement measurements are associated with the driver of the vehicle, and not all uses of mobile device by the driver 101 lead to inattentiveness. It should be appreciated that different embodiments described herein provide the framework for measuring inattentiveness, but the thresholds and classifications used for this analysis are tunable. The definitions of distraction used by embodiments can be changed at any time, if needed (e.g., for some applications, any use of a mobile device is distracting to some degree, while for other applications, hands free use of a mobile device with a Bluetooth headset is not distracting). Some entities may want to flexibly define the potential for distraction of a given activity based on the demographics of the driver (e.g., hands-free use of a mobile device by a 21 year old person is distracting to some degree, while hands-free use by a 45 year old person is not). This incorporation of a wide variety of relevant factors in determining distraction is described further herein, and different factors can be applied at different phases in the analysis (e.g., picking up a mobile device can be determined to be indicative of driver inattentiveness at decision block 320, but later analysis determines that the mobile device is being used by a passenger and is not distracting to the driver).

Examples of which types of movement measurements may be found, by some embodiments, indicative of distraction by decision block 320, and how these movement measurements may be collected and analyzed, is discussed herein.

At processing block 330, the activity being performed with mobile device 101 is estimated by some embodiments. Examples of estimated activities include, but are not limited to: (1) mobile device 101 is estimated to be being held to the driver's (or a passenger's) ear, (2) mobile device 101 is estimated to be being held by the driver (or passenger) such that the screen can be viewed, (3) mobile device 101 is being held for viewing and the driver (or passenger) is interacting with the device (e.g., purposefully touching the touch screen and/or hardware keyboard of the mobile device), (4) mobile device 101 is being moved from one location in the vehicle (e.g., a pocket, the cup holder, etc.) to another location (e.g., a bracket mount closer to the driver's field of view). Discussion of the types of processes used by some embodiments to differentiate between the driver of a vehicle and passengers are discussed herein, including with the descriptions of FIGS. 12 and 13.

In some embodiments, the estimate of the activity being performed with mobile device 101 at processing block 330 is accomplished by the interpretation of movement measurements alone (e.g., one embodiment is not receiving status information from mobile device 101 as to what applications (e.g., texting, email, phone, etc.) are being executed on the device). It is contemplated that mobile devices 101 may vary in their ability to report this status information in some embodiments. For example, an application executing on some iPhones, using some versions of Apple IOS, may not be able to receive the status of other executing applications, for any reason. With other mobile devices (e.g., those operating with Android OS), an application can determine which other applications are executing.

Additional examples of types of activities which can be estimated by processing block 330, how these estimates are made, and the potential significance of these estimates, vis-a-vis a determination of distraction, are discussed herein.

At processing block 350, in some embodiments, based on the time frame of the potentially distracting activity, aggravating and/or mitigating factors are identified. Though the attached figures illustrating embodiments should be interpreted such that, in some embodiments, all steps/components could be optional, combined with other steps/components and/or performed by different steps/components, processing block 350 has a dotted line to further emphasize the optional nature of this stage. This stage should not be interpreted to be more or less optional than other figure elements that do not have dotted lines.

Aggravating and/or mitigating factors may be identified by cross-referencing one or more of pieces of external information that include, but are not limited to: the time period of the identified activity (e.g., from 8:12 PM to 8:22 PM), the location of the identified activity from GPS measurements (e.g., Maple Road), the demographics of the person identified to be the driver of the vehicle (e.g., 22 year old male), the reported weather conditions at the location (e.g., snowing), any special status of the location (e.g., a school zone), the speed of the vehicle (e.g., 15 miles per hour), time of day (e.g., at dusk), calendar date (e.g., Christmas Eve), and/or any other similar types of information relevant to how distracting an activity could be. Examples of potential mitigating factors include, but are not limited to: the slow speed of the vehicle at the time of the event, the experience of the driver, the lack of traffic on the road, and the like.

An additional discussion of this type of cross-referencing with external data sources is found in the Incorporated Applications (e.g., grading how bad a hard braking event was by cross-referencing the event with the weather, time of day, school zone, etc.). It is contemplated that a broad variety of data sources can be combined to provide additional aggravating and mitigating factor relevant to distracted driving.

At processing block 360, based on the analysis of blocks 310-350, an estimate of the level of driver inattentiveness during a particular time period may be estimated. In some embodiments, this estimate is made using approaches described in the Incorporated Applications with respect to other driving behaviors. For example, by the processes described in the '967 application, braking events, speeding, mobile device use and other detected behaviors are analyzed and a score is generated.

Once an estimate is completed by some embodiments, a score (e.g., a metric, grade and/or any other indication likely to understood by drivers) can be generated. For example, letter grades may provide an easy-to-understand rating for different levels of distraction (e.g., an "F" assigned to a single event, and/or a drive that contained the event, where an incident was detected in which a driver sent a text message while the vehicle was moving). As described herein, and in the Incorporated Applications, grades assigned to smaller behavior features (e.g., a single event), can be weighted and/or aggregated into an evaluation of larger behavior features (e.g., a whole drive, a month of driving, a user's entire driving history, the driver's current behavior rating, and/or other similar features).

Figure 4A:
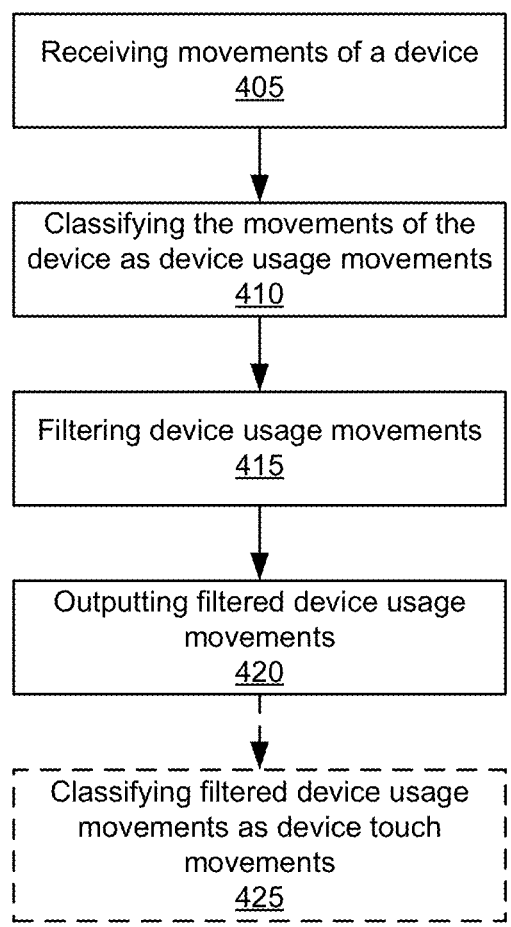
FIG. 4A is a flowchart illustrating a mobile device usage detection method according to an embodiment of the present invention.

FIG. 4A is a flowchart 400A illustrating a mobile device usage detection method according to an embodiment of the invention. The method may be performed by mobile device 101 and/or server 150 of FIG. 1, or mobile device 101 and/or server 201 of FIG. 2. At processing block 405, movements of a device are received. The device may be, for example, mobile device 101 of FIGS. 1 and/or 2. The movements may be measured by one or more sensors within sensor data block 105 of FIG. 1, such as the accelerometer, the gyroscope, the GPS and/or the magnetometer. The measurements may include the non-gravitational acceleration of the device in the x, y, and z directions; the gravitational acceleration of the phone in the x, y, and z directions; the yaw, roll, and pitch of the device; the derivatives of these measurements; the gravity difference angle of the device; and the difference in normed gravitational acceleration of the device. In one embodiment, the movements of the device may be measured in intervals, e.g., over a period of 10 seconds.

At processing block 410, the movements of the device are classified as device usage movements based on characteristics of the device movements. Device usage movements as used herein refer to movements of the device that are indicative of usage of the device by the user. Exemplary characteristics include changes in angle of the device with respect to gravity. Alternatively or additionally, the device movements may be classified as device usage movements based on a comparison of the device movements to stored movements that are known or confirmed to be device usage movements. Alternatively or additionally, the device movements may be classified as device usage movements if the number of device movements is above a threshold number. For example, if the device moves 10 times in 30 seconds, the movements may be classified as device usage movements, because the probability of the device moving that many times in that time period without usage is low.

At processing block 415, one or more filters are applied to the device usage movements. For example, the direction of the user interface of the device can be determined, and device usage movements occurring while the device is facing away from the user can be filtered out. The direction of the user interface of the device can be determined, for example, by the magnetometer, or by negative z-gravity-acceleration. In another example, device usage movements occurring while the vehicle is not moving (or moving at a speed below a threshold) can be filtered out. Whether or not the vehicle is moving can be determined, for example, from measurements made by the sensors within the device.

In still another example, device usage movements occurring while the device is face down (i.e., in a downward orientation) can be filtered out. For example, the device movements can be scanned over an interval (e.g., every 1/10 second) for a large gravity difference angle spike, which is indicative of the device being picked up. Device usage movements can be filtered out, for example, if they occur prior to the device being picked up.

At processing block 420, the filtered device usage movements can be outputted for further processing, display, storage, etc. For example, the filtered device usage movements can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device. Further, the summary statistics may be used as input features to train a machine learning ensemble. In another example, the filtered device usage movements can be added to the stored device usage movements to help classify future device usage movements.

In still another example, an alert can be generated to the user regarding the filtered device usage movements. For example, an audio alert or textual notification can be made to the user regarding the length of time the user was using the device during the trip, as discussed further in U.S. Provisional Patent Application No. 62/286,218, herein incorporated by reference in its entirety.

At optional processing block 425, the filtered device usage movements can be classified as device touch movements based on characteristics of the filtered device usage movements. Device touch movements as used herein are movements of the device indicative of touching the device by the user. For example, when a user interface of the device is repeatedly tapped by a driver, it can cause a frequency vibration in some degree that may be detectable by movements sensors, such as an accelerometer or gyroscope. In one example, an alert can be generated to the user regarding the device touch movements, such as is discussed further in U.S. Provisional Patent Application No. 62/286,218, herein incorporated by reference in its entirety.

Figure 4B:
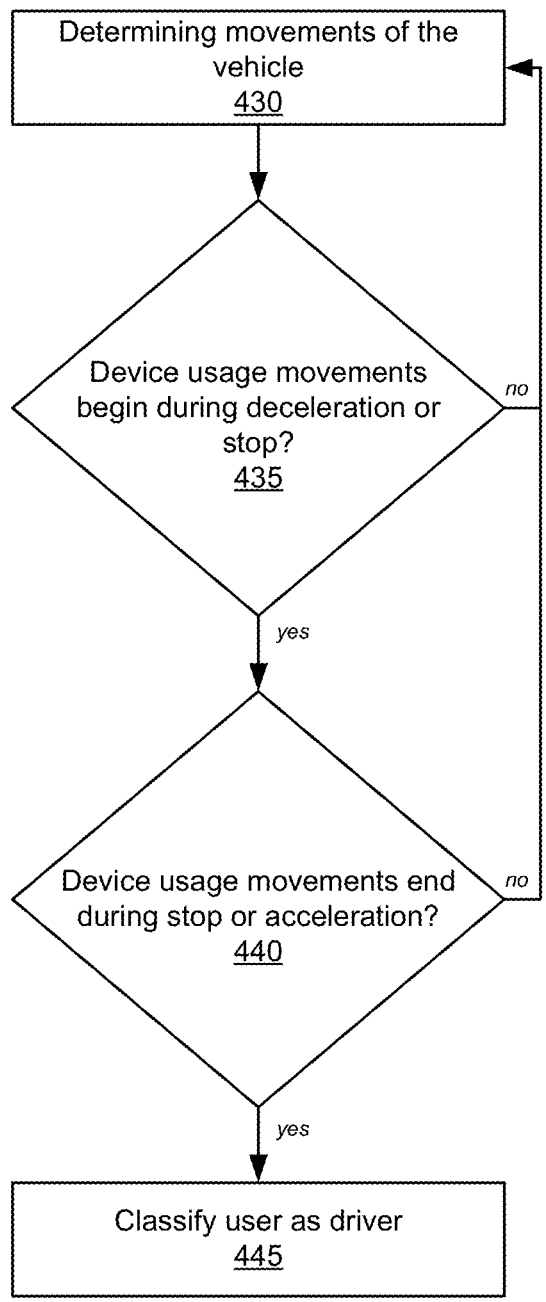
FIG. 4B is a flowchart illustrating a driver identification method using mobile device usage movements according to an embodiment of the present invention.

FIG. 4B is a flowchart 400B illustrating a driver identification method using mobile device usage movements according to an embodiment of the invention. The steps of flowchart 400B may be performed at any point of flowchart 400A after the device usage movements are classified at processing block 410. The method may be performed by mobile device 101 and/or server 150 of FIG. 1, or mobile device 101 and/or server 201 of FIG. 2. At processing block 430, movements and stops of the vehicle are determined using the movements of the device as obtained from one or more sensors, for example.

At decision block 435, it is determined whether the device usage movements begin during a deceleration or stop in the movements of a vehicle. If not, then the movements and stops of the vehicle continue to be monitored at processing block 430. If so, then the process continues at decision block 440. At decision block 440, it is determined whether the device usage movements end during a stop or an acceleration in the movements of the vehicle. If not, then the movements and stops of the vehicle continue to be monitored at processing block 430. If so, then the user is classified as a driver of the vehicle at processing block 445.

The classification of the user as a driver of a vehicle can be used in any number of ways. For example, the trip by the driver can be assigned a score based at least in part on the filtered device usage movements. Scoring of trips is discussed further in U.S. Provisional Patent Application No. 62/286,218, herein incorporated by reference in its entirety. Further disclosure with respect to driver identification can be found in U.S. patent application Ser. No. 14/139,510, filed Dec. 23, 2013, entitled "METHODS AND SYSTEMS FOR DRIVER IDENTIFICATION", herein incorporated by reference in its entirety. In an additional or alternative embodiment, the classification of the user as a driver of a vehicle according to this method can be combined with driver classifications according to other methods to determine an overall probability that the user is the driver.

Figure 4C:
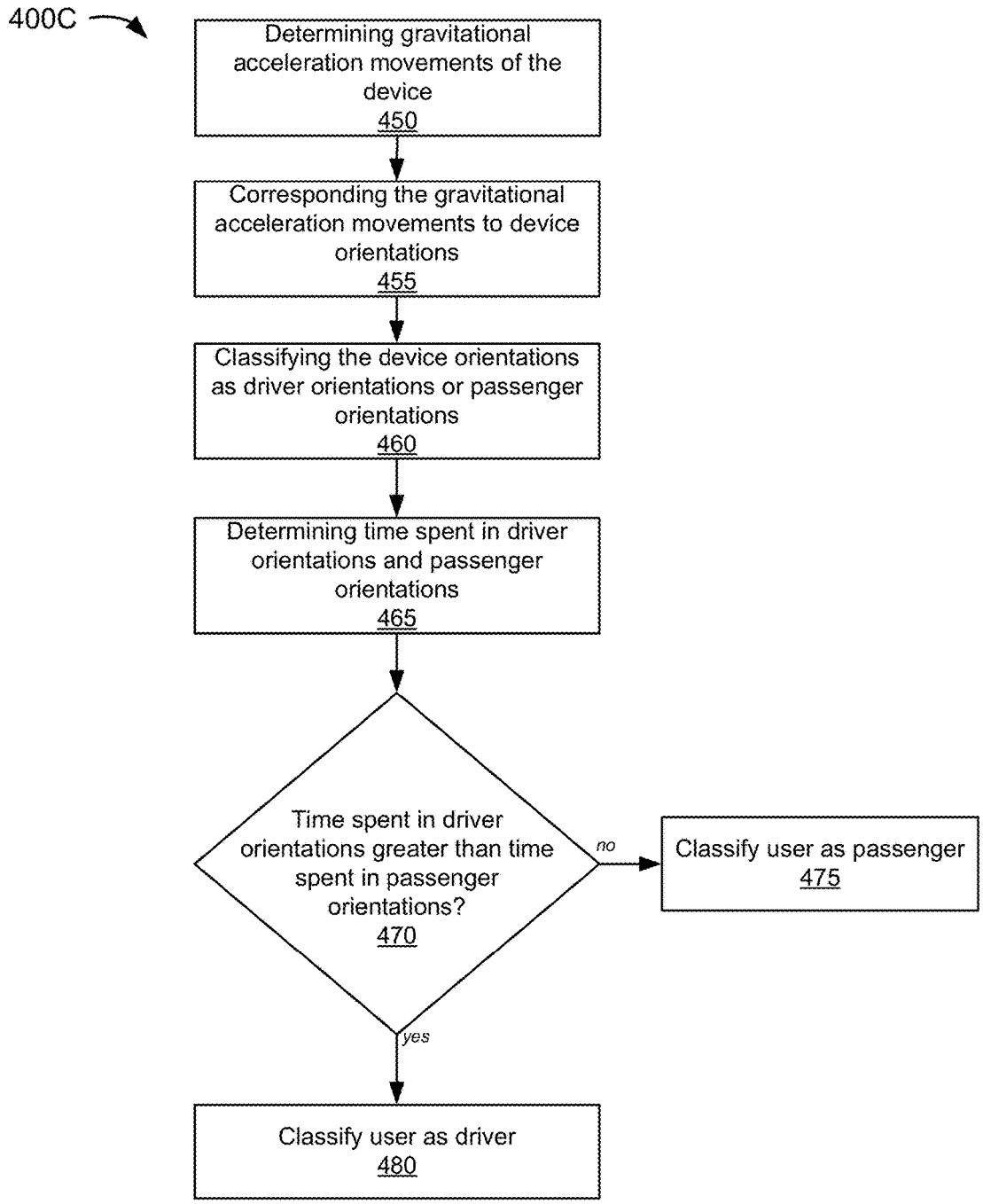
FIG. 4C is a flowchart illustrating a driver identification method using gravitational acceleration movements according to an embodiment of the present invention.

FIG. 4C is a flowchart 400C illustrating a driver identification method using gravitational acceleration movements according to an embodiment of the invention. The steps of flowchart 400C may be performed at any point of flowchart 400A after the device usage movements are classified at processing block 410. The method may be performed by mobile device 101 and/or server 150 of FIG. 1, or mobile device 101 and/or server 201 of FIG. 2.

At processing block 450, a plurality of gravitational acceleration movements of the device are determined from the device usage movements. At processing block 455, the plurality of gravitational acceleration movements are corresponded to one or more orientations of the device. The orientations of the device may include, for example, landscape tilted up, landscape flat, tilted left portrait, and the like.

At processing block 460, the one or more orientations of the device are classified as driver orientations or passenger orientations. For example, an orientation of the device may be classified as a driver orientation if that orientation is more consistent with device usage by a driver than by a passenger. In one embodiment, the driver orientations may include a tilted left portrait orientation. An orientation of the device may be classified as a passenger orientation if that orientation is more consistent with device usage by a passenger than by a driver. In one embodiment, the passenger orientations may include landscape orientations.

At processing block 465, a duration of time spent by the device in the driver orientations and the passenger orientations is determined. For example, a total amount of time spent by the device in varying landscape orientations can be determined as the amount of time spent by the device in the passenger orientations. Similarly, a total amount of time spent by the device in a tilted left portrait orientation can be determined as the amount of time spent by the device in the driver orientations.

At decision block 470, it is determined whether the duration of time spent by the device in the driver orientations is greater than the duration of time spent by the device in the passenger orientations. This determination can be made, for example, by comparing the duration of time spent by the device in the driver orientations to the duration of time spent by the device in the passenger orientations. If yes, the method continues at processing block 480, and the user is classified as a driver of the vehicle. If no, the method continues at processing block 475, and the user is classified as a passenger of the vehicle.

The classification of the user as a driver of a vehicle can be used in any number of ways. For example, the trip by the driver can be assigned a score based at least in part on the filtered device usage movements. Scoring of trips is discussed further in U.S. Provisional Patent Application No. 62/286,218, herein incorporated by reference. Further disclosure with respect to driver identification can be found in U.S. patent application Ser. No. 14/139,510, filed Dec. 23, 2013, now U.S. Pat. No. 9,398,423, issued on Jul. 19, 2016, entitled "METHODS AND SYSTEMS FOR DRIVER IDENTIFICATION", herein incorporated by reference in its entirety. In an additional or alternative embodiment, the classification of the user as a driver of a vehicle according to this method can be combined with driver classifications according to other methods to determine an overall probability that the user is the driver.

Once the trip is completed, collective data may be collected and used. The data may include the number of times that device usage begins as speed decreases to a stop; the number of times that device usage ends as speed increases from a stop; the total amount of time the device is used during the trip; the lengths of the device usage periods; and the amount of time that the device spends in a variety of positions while the user is/is not using the device, and while the user is/is not moving quickly. The positions may include landscape mode, diagonal, upright, flat, left facing, right facing, upside down, etc. In one example, summary statistics can be calculated based on the classification of the user as a driver and this collected data. For example, the statistics can be used as input features to a classification algorithm that determines whether the user is a driver or a passenger in future trips.

Figure 5:
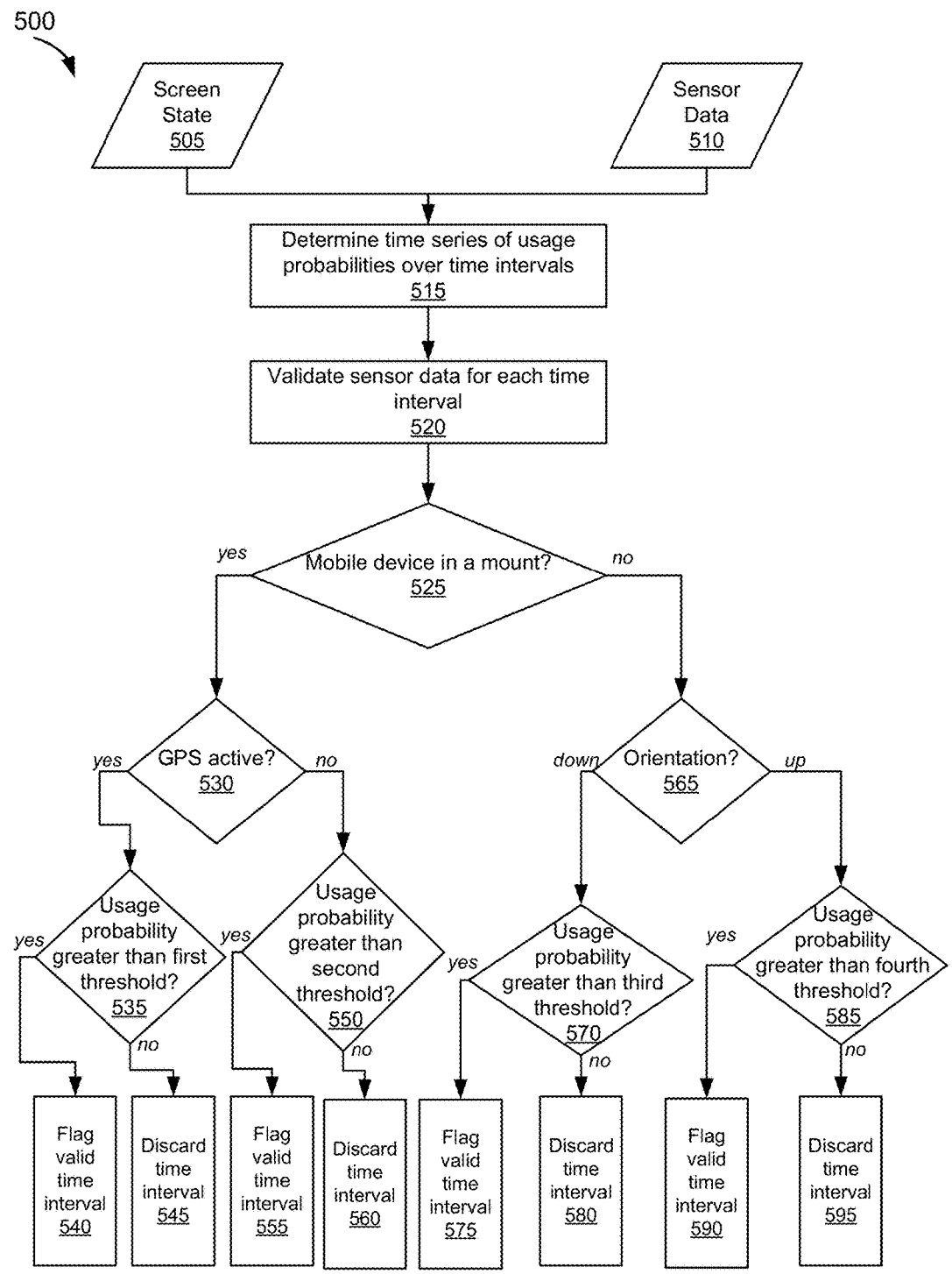
FIG. 5 is a flowchart illustrating a mobile device usage detection method using usage probabilities according to an embodiment of the present invention.

FIG. 5 is a flowchart 500 illustrating a mobile device usage detection method according to an embodiment of the invention. The method may be performed by mobile device 101 and/or server 150 of FIG. 1, and/or mobile device 101 and/or server 201 of FIG. 2. Screen state data 505 and sensor data 510 are collected over one or more time intervals from mobile device 101 during a trip in a vehicle. The time intervals may of any length, such as, for example, 10 second time intervals. Screen state data 505 may be determined by an operating system of mobile device 101, and may indicate whether the screen of mobile device 101 is on or off at a given point in time. Sensor data 510 may include any data collected by sensor data block 105 of mobile device 101, such as, for example, gyroscope data, accelerometer data, global positioning system (GPS) data, and the like.

At processing block 515, a time series of usage probabilities are determined over the time intervals based on a comparison of the screen state data 505 and sensor data 510 to known usage data. In some embodiments, a machine learning classifier may be applied to the screen state data 505 and sensor data 510. For example, the screen state data 505 and sensor data 510 can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device. Further, the summary statistics may be used as input features to train a machine learning ensemble. In another example, the screen state data 505 and sensor data 510 can be added to the stored device usage movements to help classify future device usage movements.

The usage probabilities comprise probabilities that the user of mobile device 101 is interacting with mobile device 101 during the trip over each time interval. The known usage data may comprise previously collected screen state date and/or sensor data from previous trips taken by the user of mobile device 101 and/or other users of other mobile devices, with the data labeled according to known usage periods. The usage periods may be known, for example, because they were explicitly reported as usage periods by the users of the mobile devices. In another example, the usage periods may have been determined to be known usage periods according to the embodiments described herein or according to any other device usage detection method. For example, the usage periods may have been determined to be known usage periods according to the systems and methods described in U.S. Provisional Patent Application No. 62/318,983, filed Apr. 6, 2016, and/or U.S. Provisional Patent Application No. 62/219,989, filed Sep. 17, 2015, herein incorporated by reference in their entireties.

At processing block 520, the sensor data 510 is validated for each time interval. In one embodiment, sensor data 510 is validated for a time interval if there is no significant sensor dropout during the time interval. In an additional or alternative embodiment, sensor data 510 is validated for a time interval if the user of mobile device 101 is driving faster than a threshold speed (e.g., 2.6 m/s) during the time interval. This prevents data within sensor data 510 from being validated if the user is using mobile device 101 while stopped, slowing to a stop, driving at a slow rate of speed, etc. In an additional or alternative embodiment, sensor data 510 is validated if the screen state is "on" during the time interval, as indicated by the screen state data 505. Any of a number of other criteria may be used to determine whether the sensor data 510 should be validated for a time interval. For example, sensor data 510 may be validated only if mobile device 101 has a negative grav-z acceleration. In another example, sensor data 510 may be validated only if sensor data 510 is not within a threshold time period of the end of the trip.

At decision block 525, it is determined whether mobile device 101 is in a mount in the vehicle during each time interval of the trip based on a comparison of sensor data 510 to known mount data. This determination may be made, for example, by a mount detection engine within device usage engine 256, which may be implemented in mobile device 101, server 150, and/or server 201. In one example, a machine learning classifier may be applied to the sensor data 510. The known mount data may comprise previously collected sensor data from previous trips taken by the user of mobile device 101 and/or other users of other mobile devices, with the data labeled according to known mount periods. The mount periods may be known, for example, because they were explicitly reported as periods that the mobile devices were mounted in the vehicle by the users of the mobile devices. In another example, the mount periods may have been determined to be known mount periods according to any other device mount detection method.

For example, the sensor data 510 can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device as mount periods. Further, the summary statistics may be used as input features to train a machine learning ensemble. In another example, the sensor data 510 can be added to the known mount data to help classify future mount movements.

If it is determined that mobile device 101 is in a mount at decision block 525, the method continues at decision block 530. At decision block 530, it is determined whether a GPS application is active on mobile device 101 during each time interval during which mobile device 101 was in a mount. This determination may be made, for example, by a GPS active detection engine within device usage engine 256, which may be implemented in mobile device 101, server 150, and/or server 201. A GPS active detection engine is described in further detail herein with respect to FIG. 6.

Figure 6:
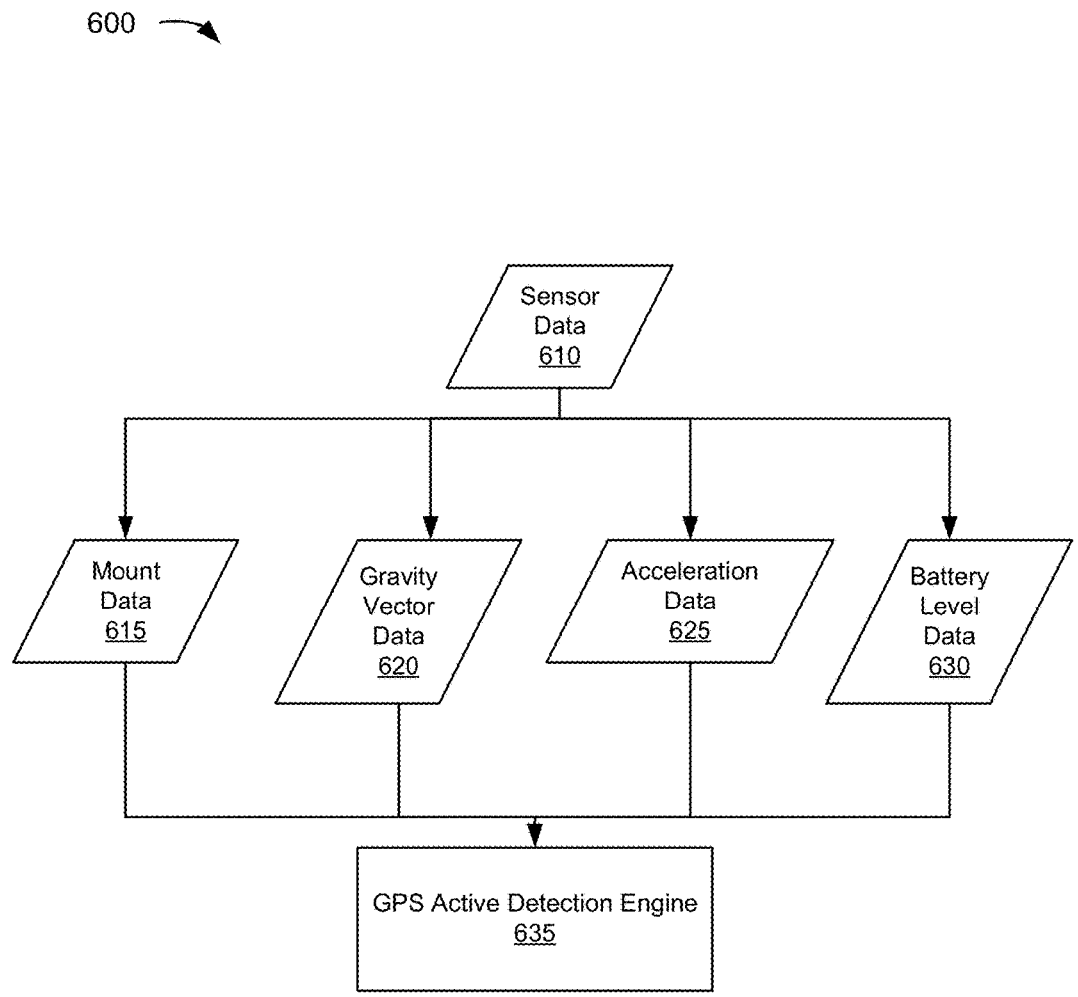
FIG. 6 is a flowchart illustrating the inputs into a global positioning system (GPS) active detection engine according to an embodiment of the present invention.

In one example, a machine learning classifier may be applied to various data sources described in FIG. 6 to compare sensor data 510 and/or any other collected data from mobile device 101 to known GPS active data. The known GPS active data may comprise previously collected data from previous trips taken by the user of mobile device 101 and/or other users of other mobile devices, with the data labeled according to known GPS active periods. The GPS active periods may be known, for example, because they were explicitly reported as periods that a GPS application was being used on the mobile device, as reported by the user of the mobile device. In another example, the GPS active periods may have been determined to be known GPS active periods according to any other GPS active detection method. In another embodiment, it may be determined directly from the operating system of mobile device 101 that a GPS application is in the foreground of mobile device 101.

With respect to the machine learning classifier, the sensor data 510 can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device as GPS active periods. Further, the summary statistics may be used as input features to train a machine learning ensemble. In another example, the sensor data 510 can be added to the known GPS active data to help classify future GPS active movements.

If it is determined that mobile device 101 has an active GPS application at decision block 530, the method proceeds at decision block 535. At decision block 535, it is determined whether the usage probability for the time intervals in which the GPS is active on mobile device 101 is greater than a first threshold. The first threshold may be relatively high so as not to identify distraction when mobile device 101 is properly being used as a GPS device in a mount.

If it is determined that the usage probability for a time interval in which the GPS is active on mobile device 101 exceeds the first threshold, the method proceeds at processing block 540. At processing block 540, the time interval is flagged as a device usage period if it was determined to be valid at processing block 520. If it is determined that the usage probability for a time interval in which the GPS is active on mobile device 101 does not exceed the first threshold, the method proceeds at processing block 545. At processing block 545, the time interval is discarded.

If it is determined that mobile device 101 does not have an active GPS application (i.e., mobile device 101 has a GPS application that is inactive, mobile device 101 does not have a GPS application, etc.) at decision block 530, the method proceeds at decision block 550. At decision block 550, it is determined whether the usage probability for the time intervals in which there is no active GPS application on mobile device 101 is greater than a second threshold. The second threshold may be relatively low so as to identify distraction when mobile device 101 is being used for purposes other than GPS purposes while it is mounted. In one embodiment, the second threshold is lower than the first threshold.

If it is determined that the usage probability for a time interval in which there is no active GPS application on mobile device 101 exceeds the second threshold, the method proceeds at processing block 555. At processing block 555, the time interval is flagged as a device usage period if it was determined to be valid at processing block 520. If it is determined that the usage probability for a time interval in which there is no active GPS application on mobile device 101 does not exceed the second threshold, the method proceeds at processing block 560. At processing block 560, the time interval is discarded.

If it is determined that mobile device 101 is not in a mount at decision block 525, the method continues at decision block 565. At decision block 565, it is determined whether mobile device 101 is in a downward or upward orientation. This determination may be made, for example, by analyzing sensor data 510. A "downward orientation" of mobile device 101 may be considered any orientation in which the screen of mobile device 101 is not facing or is unviewable to the user of mobile device 101. An "upward orientation" of mobile device 101 may be considered any orientation in which the screen of mobile device 101 is facing or is viewable to the user of mobile device 101.

If it is determined that mobile device 101 is in a downward orientation at decision block 565, the method continues at decision block 570. At decision block 570, it is determined whether the usage probability for a time interval in which mobile device 101 is in a downward orientation exceeds a third threshold. The third threshold may be relatively high because it is unlikely that the user is using and/or distracted by mobile device 101 when the screen of mobile device 101 is pointing away from the user.

If it is determined that the usage probability for the time interval in which mobile device 101 is in a downward orientation exceeds the third threshold, the method proceeds at processing block 575. At processing block 575, the time interval is flagged as a device usage period if it was determined to be valid at processing block 520. If it is determined that the usage probability for the time interval in which mobile device 101 is in a downward orientation does not exceed the third threshold, the method proceeds at processing block 380. At processing block 380, the time interval is discarded.

If it is determined that mobile device 101 is in an upward orientation at decision block 565, the method continues at decision block 585. At decision block 585, it is determined whether the usage probability for a time interval in which mobile device 101 is in an upward orientation exceeds a fourth threshold. The fourth threshold may be relatively low because it is more likely that the user is using and/or distracted by mobile device 101 when the screen of mobile device 101 is pointing toward the user.

If it is determined that the usage probability for the time interval in which mobile device 101 is in an upward orientation exceeds the fourth threshold, the method proceeds at processing block 590. At processing block 590, the time interval is flagged as a device usage period if it was determined to be valid at processing block 520. If it is determined that the usage probability for the time interval in which mobile device 101 is in an upward orientation does not exceed the fourth threshold, the method proceeds at processing block 595. At processing block 595, the time interval is discarded.

Once the method has been completed for all of the time intervals of the trip, the time intervals flagged as device usage periods may be consolidated into continuous usage periods if they are within a threshold time of each other. In one embodiment, device usage periods within a minute of each other may be consolidated. For example, if device usage periods are identified between (A) minute 5 of a trip and minute 5:10, (B) minute 5:10 and minute 5:20, and (C) minute 5:40 and minute 5:50, then minute 5 to minute 5:50 may be consolidated into a continuous usage period.

Once continuous usage periods are identified, they may be used to perform analytics or to take further actions. In one embodiment, the continuous usage periods may be calculated to assign a score to a trip. Scoring of trips is described further in U.S. Provisional Patent Application No. 62/286, 218 and U.S. Provisional Patent Application No. 62/346,013, herein incorporated by reference in their entireties. For example, a percentage of the time intervals that are identified as continuous usage periods may be calculated. The percentage may then be compared to percentages from other users, such as an average percentage, to determine how the device usage behavior of the user of mobile device 101 compares to other users. In one example, if the percentage for the user of mobile device 101 is lower than an average percentage, a high score may be assigned to the trip. If the percentage for the user of mobile device 101 is higher than an average percentage, a low score may be assigned to the trip.

Driver identification methods may also be applied in conjunction with the method illustrated in FIG. 5. In one embodiment, the screen state data 505 and sensor data 510 may be used to calculate summary statistics for time intervals in which the screen is on. A machine learning classifier may be applied to the summary statistics to compare sensor data 510 to known driver usage data. The known driver usage data may comprise previously collected sensor data from previous trips taken by the user of mobile device 101 while driving and/or other drivers using other mobile devices, with the data labeled according to known driver usage periods. The driver usage periods may be known, for example, because they were explicitly reported as periods that the mobile devices were being used by drivers in the vehicles. In another example, the driver usage periods may have been determined to be known driver usage periods according to any other driver usage detection method, such as those disclosed in U.S. Provisional Patent Application No. 62/318,983, herein incorporated by reference in its entirety.

In some embodiments, the screen state data 505 and sensor data 510 can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device as driver usage periods. Further, the summary statistics may be used as input features to train a machine learning ensemble. In another example, the sensor data 510 can be added to the known driver usage data to help classify future driver usage movements.

In an additional or alternative embodiment, a user of mobile device 101 may be classified as a driver of the vehicle if it is determined that mobile device 101 is mounted at decision block 525. This classification is made based on the assumption that drivers of vehicles are more likely to mount their mobile devices in their vehicles than passengers.

FIG. 6 is a flowchart 600 illustrating the inputs into a GPS active detection engine 635 according to an embodiment of the invention. The GPS active detection engine 635 may be implemented in mobile device 101 and/or server 150 of FIG. 1, and/or mobile device 101 and/or server 201 of FIG. 2. Sensor data 610 is collected from mobile device 101 during a trip in a vehicle. Sensor data 610 may include any data collected by sensor data block 105 of mobile device 101, such as, for example, gyroscope data, accelerometer data, global positioning system (GPS) data, and the like. Sensor data 610 may also include any data collected by any additional sensors or components of mobile device 101 that are not illustrated in sensor data block 105. Sensor data 610 may be the same as or different than sensor data 510 of FIG. 5.

Various types of data may be extracted from the sensor data 610, such as mount data 615, gravity vector data 620, acceleration data 625, and/or battery level data 630. Mount data 615 may be a determination of whether or not mobile device 101 is in a mount, as decided at decision block 525 of FIG. 5, for example. Mount data 615 may be provided to GPS active detector 635, and may be relevant because a GPS application may be more likely to be active when mobile device 101 is mounted.

Gravity vector data 620 may comprise summary statistics of gravity vectors during the trip. Gravity vector data 620 may be provided to GPS active detection engine 635. Gravity vector data 620 may be relevant because initiation and/or use of a GPS application may have certain gravity vectors associated with the movements of mobile device 101.

Acceleration data 625 may comprise summary statistics of horizontal and vertical acceleration during the trip. Acceleration data 625 may be provided to GPS active detection engine 625. Acceleration data 625 may be relevant because initiation and/or use of a GPS application may have certain accelerations associated with the movements of mobile device 101.

Battery level data 630 may comprise data provided by the operating system of mobile device 101, for example, that allows calculation of a slope of the battery level curve. Battery level data may be provided to GPS active detection engine 625. Battery level data 630 may be relevant because use of a GPS application may drain the battery of mobile device 101 faster than if a GPS application is not being used.

Mount data 615, gravity vector data 620, acceleration data 625, and/or battery level data 630 may be input into GPS active detection engine 635 for further analysis to determine whether a GPS application is active on mobile device 101. GPS active detection engine 635 may determine that a GPS application is active on mobile device 101, for example, by applying a machine learning classifier to the data 615-630 to compare the data 615-630 to known GPS active data, as described further herein. The known GPS active data may comprise previously collected data from previous trips taken by the user of mobile device 101 and/or other users of other mobile devices, with the data labeled according to known GPS active periods. The GPS active periods may be known, for example, because they were explicitly reported as periods that a GPS application was being used on the mobile device, as reported by the user of the mobile device. In another example, the GPS active periods may have been determined to be known GPS active periods according to any other GPS active detection method. In another embodiment, it may be determined directly from the operating system of mobile device 101 that a GPS application is in the foreground of mobile device 101.

For example, the data 615-630 can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device as GPS active periods. Further, the summary statistics may be used as input features to train a machine learning ensemble. In another example, the data 615-630 can be added to the known GPS active data to help classify future GPS active movements.

FIGS. 7A and 7B, 8A and 8B, and 9A and 9B are graphs of actual mobile device usage intervals and accelerometer measurements during those intervals when a user is using a mobile device according to an embodiment of the present invention. For example, FIG. 7A shows time intervals in which a user was playing a game 710 and taking a phone call 720 on a mobile device. FIG. 7B shows the accompanying x acceleration data 730, y acceleration data 740, and z acceleration data 750 as collected by an accelerometer of the mobile device before, during and after the usage. As shown in FIG. 7B, the x accelerations 730 and z accelerations 750 increased during the usage time periods, while the y acceleration 740 decreased.

FIG. 8A shows time intervals in which a user was using different applications, for example, Facebook 810 and Snapchat 820, on a mobile device. FIG. 8B shows the accompanying x acceleration data 830, y acceleration data 840, and z acceleration data 850 as collected by an accelerometer of the mobile device before, during and after the usage. As shown in FIG. 8B, the y accelerations 840 and z accelerations 850 increased during the usage time periods, while the x accelerations 830 decreased.

FIG. 9A shows time intervals in which a user was using e-mail 910, applications (e.g., Spotify 920a, 920b and Snapchat 930), and text messaging 940 on a mobile device. FIG. 9B shows the accompanying x acceleration data 940, y acceleration data 950, and z acceleration data 960 as collected by an accelerometer of the mobile device before, during and after the usage. As shown in FIG. 9B, the z accelerations 960 increased, while the x accelerations 940 and y accelerations 950 decreased, and/or the accelerations that were otherwise stable exhibited a large degree of variance.

The data collected and shown in FIGS. 7A and 7B, 8A and 8B and 9A and 9B may be used as known usage data as described herein. For example, FIGS. 7B, 8B, and 9B may be labeled according to the known usage periods shown in FIGS. 7A, 8A, and 9A. The usage periods may be known, for example, because they were explicitly reported as usage periods by the users of the mobile devices. The data in the known usage periods may then be used by a machine learning classifier to classify other usage periods showing similar acceleration characteristics. In another example, FIGS. 7B, 8B and 9B may be used by embodiments of the invention to predict mobile device usage behavior, and those predictions may be compared to FIGS. 7A, 8A, and 9A to determine their accuracy.

For example, the data shown in FIGS. 7B, 8B and 9B can be used to compute summary statistics, such as max, min, mean, med-abs-dev, covariance, percentiles, range, skew, kurtosis, correlation coefficients, zero crossings, entropy, and/or power. The summary statistics may then be used to classify future movements of the device as usage periods. Further, the summary statistics may be used as input features to train a machine learning ensemble. In another example, the data shown in FIGS. 7B, 8B and 9B can be added to the known usage data to help classify future usage movements.

FIGS. 10A-10D are plots of sensor measurements and predicted usage intervals according to an embodiment of the invention. FIG. 10A illustrates the speed of a vehicle 1010 over time as measured by mobile device 101 of FIGS. 1 and/or 2 during a trip, for example, as a line. The shaded areas of FIG. 10A represent predicted device usage periods 1015, 1020. FIG. 10B illustrates the gravity diff angle 1025 over time as measured by mobile device 101 of FIGS. 1 and/or 2 during a trip, for example. FIG. 10C illustrates the screen on probabilities 1030 over time of mobile device 101 of FIGS. 1 and/or 2 during a trip, for example. The shaded area 1035 of FIG. 10C represents the screen of the mobile device 101 in an "on" state. FIG. 10D illustrates the acceleration in the x direction 1040, y direction 1045 and z direction 1050 over time as measured by mobile device 101 of FIGS. 1 and/or 2 during a trip, for example.

FIG. 11A is a plot of predicted device usage 1110 and actual usage 1120 according to an embodiment of the invention. The plot of FIG. 11A may be generated as output by device usage engine 256 of FIG. 2, for example, and/or by performing any or all of the methods of FIGS. 3-6. FIG. 11B is a plot of the actual or known device usage 1130 according to an embodiment of the invention. As shown in FIGS. 11A and 11B, the predicted device usage periods provided by embodiments of the invention accurately predict actual device usage.

Figure 12:
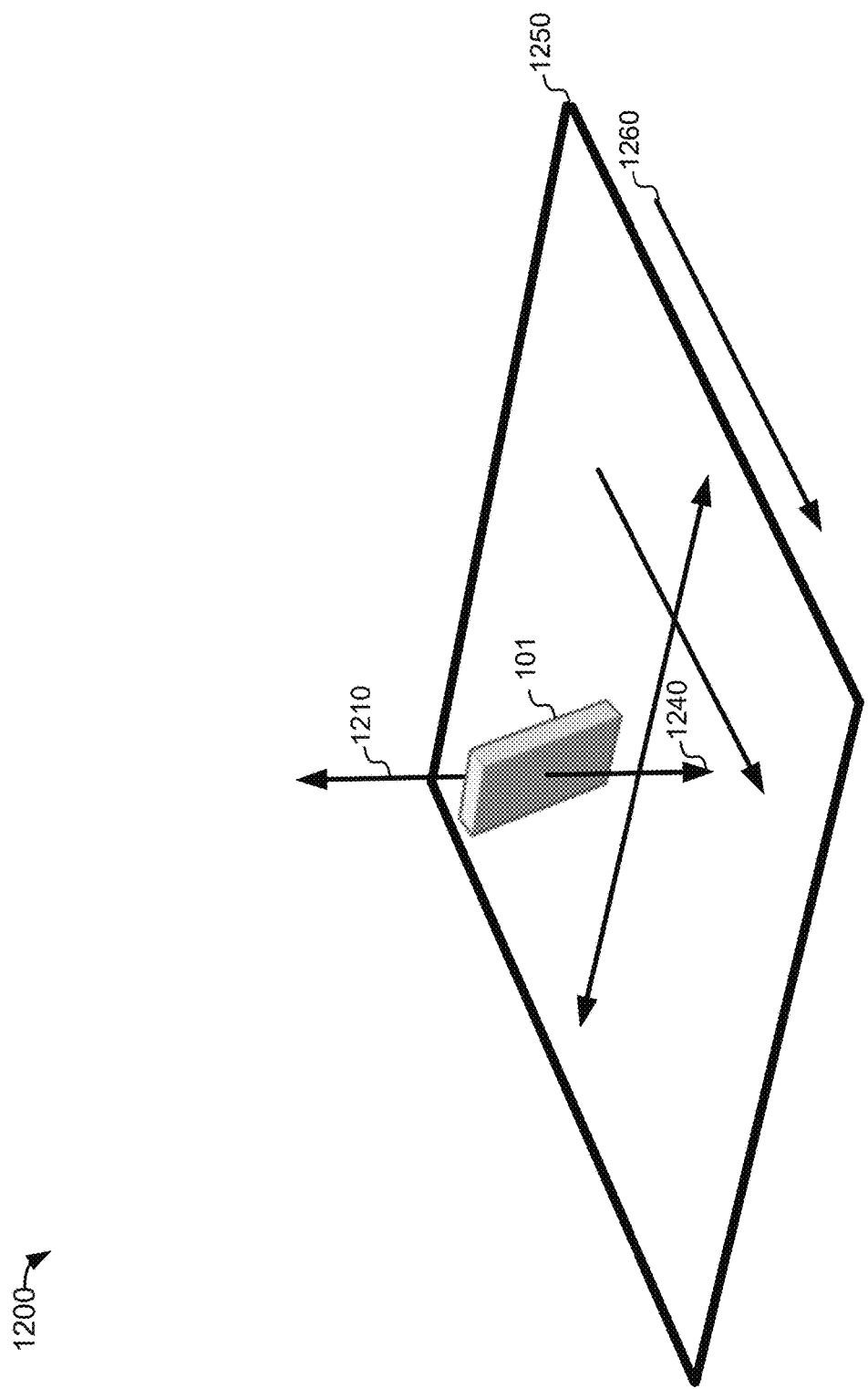
FIG. 12 is a diagram of a mobile device in a vehicle according to an embodiment of the present invention.

FIGS. 12-18 provide examples of different types of processes, used by some embodiments, to collect and analyze movement measurements from mobile device 101. FIG. 12 is a diagram 1200 of a mobile device 101 in a vehicle 1250, according to an embodiment. FIG. 12 depicts a vehicle 1250 having a driver (not shown) where mobile device 101 is used to provide movement measurements that enable estimates of driving behavior.

In some embodiments, as described in the '603 application, using an extended Kalman filter applied to movement data from mobile device sensors, a gravity vector (e.g., gravity vector 1240) for a mobile device (e.g., mobile device 101) in a moving vehicle (e.g., vehicle 1250) moving in the direction indicated by reference numeral 1260. Generally speaking, in a moving vehicle, the determined gravity vector of the mobile device as a function of time is always changing.

To determine a change in the orientation of mobile device 101 relative to vehicle 1250, some embodiments analyze two gravity vectors associated with a time point (t), for example, gravity vectors G(t) before and after the time point (e.g., at t−15 seconds and t+15 seconds). By comparing these gravity vectors over a time interval, a difference in gravity angle (e.g., measured in radians), and gravity magnitude can be determined 1240 (respectively termed herein, gravity angle difference and gravity magnitude difference). It should be appreciated that a larger or smaller interval can also be used. It is also important to note that, while embodiments described herein are described as operating on stored data (i.e., after the drive has completed, not in real time), the components, principles and approaches described herein could also operate in substantially real-time (e.g., using a t−30 and t−15 interval for example to analyze gravity vectors, or other suitable approach).

In some embodiments, whether the mobile device remained stationary within the vehicle during a time interval can be estimated by comparing the determined gravity angle difference and the determined gravity magnitude difference to one or more thresholds. In an example of this threshold comparison, having a gravity angle difference above one (1) radian and a gravity magnitude difference above one (1) g indicate to an embodiment that the mobile device likely moved relative to the vehicle at time point (t). It is contemplated that different combinations of threshold values could be used, e.g., different gravity magnitude differences, different gravity angle differences, and/or requiring multiple consecutive differences over thresholds before a change in orientation is estimated.

Figure 13:
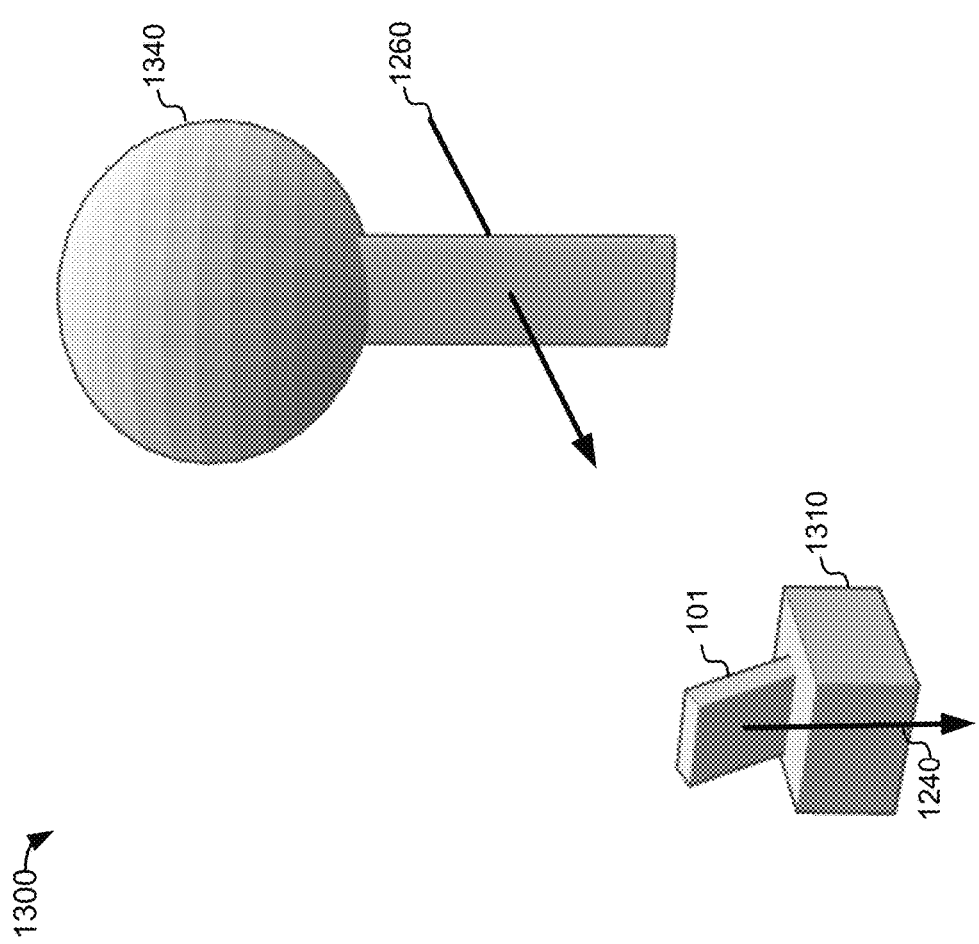
FIG. 13 is a diagram of a driver and a mobile device in a vehicle according to an embodiment of the present invention.

FIG. 13 is a diagram 1300 of a driver 1340 and a mobile device 101 in a vehicle according to an embodiment. Mobile device 101 is in a cup holder 1310. Vector 1260 shows the direction of the vehicle relative to driver 1340. Gravity vector 1240 shows that mobile device 101 is angled backwards in cup holder 1310. For some embodiments, this is the starting point of the drive, e.g., mobile device 101 is placed in cup holder 1310, the drive begins, and any movement of mobile device 101 relative to vehicle 1250 is detected and measured for distraction potential. Other example starting positions include, but are not limited to: mounted in a mobile device holder attached to a windshield, rear view mirror, dashboard or other similar vehicle surface, placed on a seat, in a clothes pocket, and the like. It is important to note that, some embodiments do not need any indication of where mobile device 101 is placed within a vehicle in order to perform the movement measurement analysis described herein.

Figure 14:
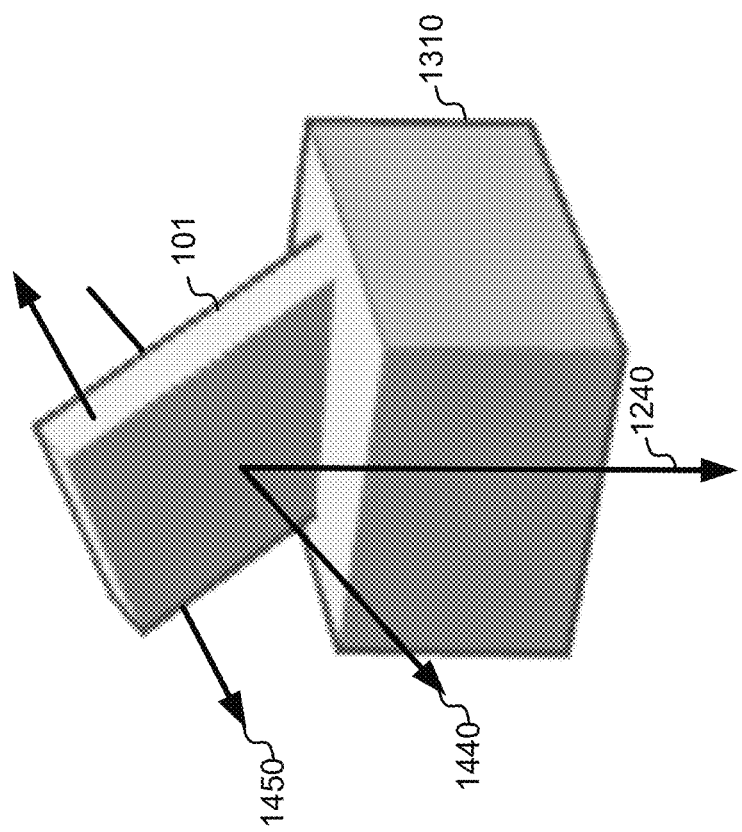
FIG. 14 is a diagram of a mobile device in a cup holder in a vehicle according to an embodiment of the present invention.

FIG. 14 is a diagram of a mobile device in a cup holder in a vehicle according to an embodiment. Differing from the placement of mobile device 101 in the cup holder of FIG. 13, angle 1450 shows that mobile device 101 is angled to the left (to the driver's right) in the cup holder 1310. It is important to note that, some embodiments to not need any particular orientation of mobile device 101 to be able to collect useful movement measurements for embodiments.

Vector 1440 illustrates a direction perpendicular to the back (and front) of mobile device 101. As discussed with the description of FIGS. 17 and 18 below, this vector 1440 is used by some embodiments to estimate whether a person is interacting with the mobile device, e.g., typing on a keyboard.

Figure 15:
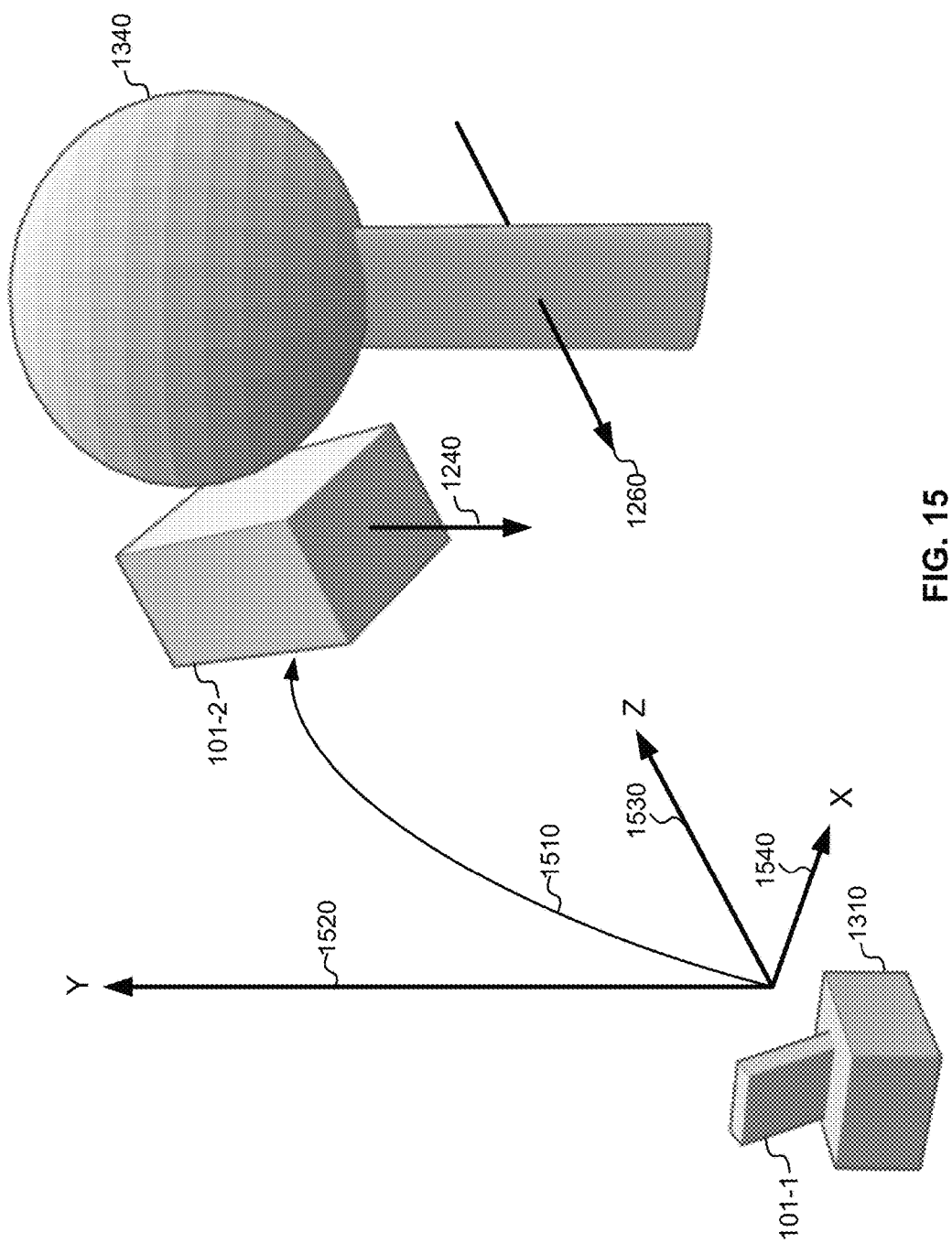
FIG. 15 is a diagram of a driver, a mobile device and accelerometer data according to an embodiment of the present invention.

FIG. 15 is a diagram of a driver 1340, a mobile device 101-1, 101-2 and accelerometer data according to an embodiment. When sitting in cup holder 1310, mobile device 101 is generally not moving relative to the vehicle. Even if mobile device 101 moves around within cup holder 1310, this movement can be subject to a threshold that would be exceeded before triggering further analysis.

In contrast to a minor movement example (e.g., sliding around in cup holder 1310), FIG. 15 shows an example of a move of mobile device 101 that could trigger analysis by some embodiments. In this example, driver 1340 takes mobile device 101-1 in hand (hand not shown), lifts it up, toward him, and to the right. This movement can be detected and analyzed by accelerometer 112 and gyroscope 138. The measurements collected from this accelerometer 112, as mobile device 101 moves along track 1510, are shown in relation to X axis 1540, Y axis 1520 and Z axis 1530. In some embodiments, the movement shown in FIG. 15 is sufficient to trigger further analysis for distraction potential, e.g., mobile device 101 was mounted, but now it is moving. Some embodiments assess that this could be because the driver is holding the device and typing on the screen, or making a phone call without a headset.

After mobile device 101 stops moving (e.g., it is moved from position 101-1 to position 101-2), the change in orientation is measured. In this example, after the orientation measurement, the position 101-2 of mobile device 101 is depicted in FIG. 15. As shown in FIG. 15, mobile device 101 is angled in such a way that it could be used as a telephone, without use of a hands free device. Based on the orientation 101-2 of mobile device 101, in some embodiments, the estimated activity is that driver 1340 is holding mobile device 101 to her ear, and thus making a phone call without use of a headset.

It is worth noting the processes, used by some embodiments, to differentiate between used of mobile device 101 by the driver of a vehicle and non-drivers, e.g., passengers in either the front of the vehicle with the driver or in rearward seats. Using the example from FIG. 15, mobile device 101 in position 101-2 is determined to be pointing at driver 1340, and thus some embodiments would estimate mobile device 101 was being used by the driver in that position. Similarly, in a different example, mobile device 101 can be facing the passenger's seat, or rear seats (with accompanying accelerometer data suggesting a movement along the Z axis 1530 to the back seats). In this different example, driver 1340 would not be estimated by some embodiments to be distracted by this movement.

Figure 16:
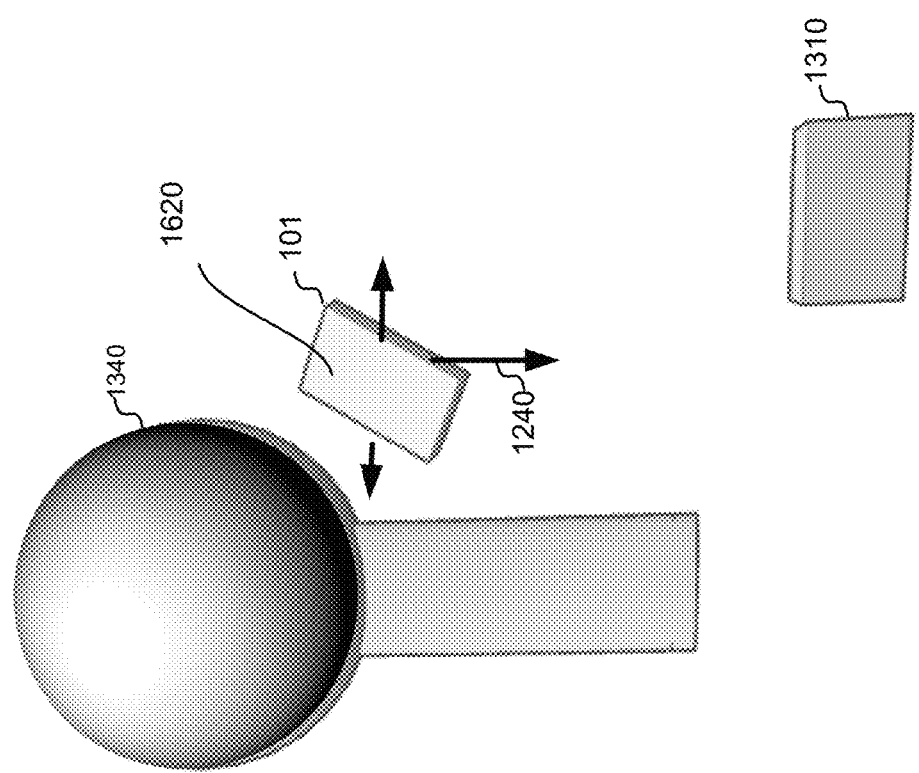
FIG. 16 is a diagram of a driver of a mobile device held up toward the driver for screen viewing according to an embodiment of the present invention.

FIG. 16 is a diagram of a driver 1340 and a mobile device 101 held up toward the driver for screen viewing according to an embodiment. As another example of measuring movement and estimating activity, FIG. 16 shows a view of driver 1340 from the back and mobile device 101. In this example, it can be seen that mobile device 101 also undergoes a significant move (yet shorter than the move discussed with FIG. 15) from cup holder 1310 to a position where screen 1620 is facing driver 1340. As with FIG. 15, in some embodiments, this move can trigger further analysis of the position of mobile device 101. It is worth noting that, this analysis first of movement, then of position can, in some embodiments, improve the efficiency of the process (e.g., by reducing the amount of movement measurements that are collected and stored for later analysis or by reducing real-time analysis of movement measurements). It is also important to note that, different types of measurement collection and analysis can be performed sequentially, simultaneously and/or combinations of the two approaches.

Figure 17:
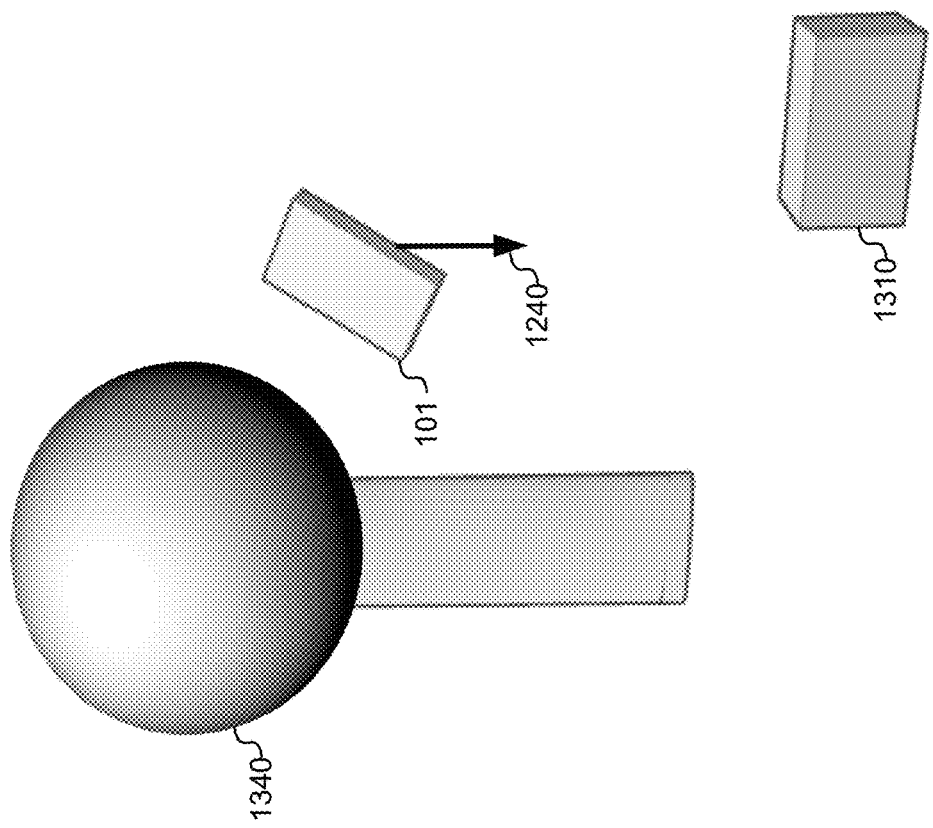
FIG. 17 is a diagram of a driver and a mobile device held up toward the driver for viewing and touch interface interaction according to an embodiment of the present invention.

FIG. 17 is a diagram of a driver 1340 and a mobile device 101 held up toward the driver for viewing and touch interface interaction according to an embodiment. This view (e.g., from the right side of driver 1340) shows another view of a mobile device 101 orientation where mobile device 101 is positioned in a way that, in some embodiments, is assessed to be indicative of a reading or typing action being performed by driver 1340. It is contemplated that some embodiments can be configured to detect different orientations of mobile device 101 and analyze these orientations to estimate other types of activities of driver 1340.

In some embodiments, movement and orientation of mobile device 101 that is similar to the examples of FIGS. 16 and 17 signal a likelihood that, in addition to viewing screen 1620, driver 1340 may be interacting with interface elements of mobile device 101 (termed herein as "interactions" or "touches"). It is contemplated that interactions (e.g., touching a user interface, typing on a user interface or hardware keyboard, swiping, tapping, and/or other input events) can be a distracting activity for driver 1340. Some embodiments use different approaches to determine whether different interactions are occurring.

Figure 18:
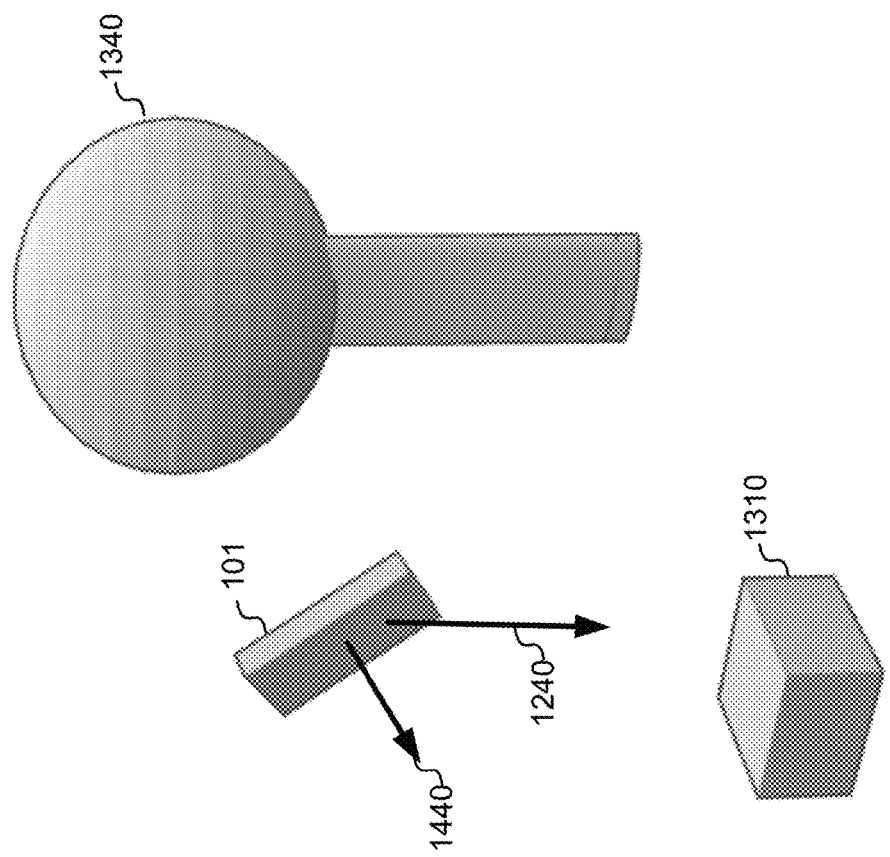
FIG. 18 is another diagram of a driver and a mobile device held up toward the driver for viewing and touch interface interaction according to an embodiment of the present invention.

FIG. 18 is another diagram of a driver 1340 and a mobile device 101 held up toward the driver potentially for viewing and touch interface interaction, according to an embodiment. Vector 1440, introduced above in an example where mobile device 101 was still in cup holder 1310, is used by some embodiments to detect interactions with driver 1340. For example, when a keyboard (software or hardware) is repeatedly tapped by driver 1340, it can cause a frequency vibration towards vector 1440 in some degree (e.g., detectable by movement sensors, such as accelerometer 112 and gyroscope 116) (termed herein "device touch movements").

In another example, detecting a single tap, then a tilting movement in a particular direction can indicate a swiping gesture to some embodiments. It should be noted that, rather than using indications from the operating system of mobile device 101 to determine specific application activities (e.g., texting, social media posting, scrolling of content, etc.), some embodiments use device sensors to detect the underlying (potentially distracting) elements of these specific activities.

It is contemplated that the detection of different interactions or touches can be measured, tuned and customized for individual users, or can also be tuned for generic users. In some embodiments, it is a combination of the processes discussed herein (e.g., movement to an orientation, the orientation, and the detected device touch movements) that lead to the estimates of different activities.

Also, in some embodiments, individual processes described herein can lead to estimates. For example, if device usage movements are detected in mobile device 101 while mobile device 101 is stationary in vehicle 1250 (e.g., as with the example discussed with FIG. 13 where mobile device 101 is in cup holder 1310, or mounted on the vehicle dashboard), the device usage movements can be such that some embodiments estimate that interaction is occurring with mobile device 101 by driver 1340 (i.e., device touch movements).

It should be appreciated that the specific steps illustrated in FIGS. 3-6 provide a particular method of collecting driving data using a model according to an embodiment of the present invention. Other sequences of steps may also be performed according to alternative embodiments. For example, alternative embodiments of the present invention may perform the steps outlined above in a different order. Moreover, the individual steps illustrated in FIGS. 3-6 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. It is contemplated that various modifications may be made in light of the embodiments described herein. These are to be included within the spirit and purview of this application, and the scope of the appended claims, which follow.

What is claimed is:

1. A system comprising:
   a mobile device comprising a plurality of sensors;
   a memory; and
   a processor coupled to the memory, wherein the processor is configured to perform operations including:
      obtaining a plurality of movement measurements over a plurality of time intervals from at least one of the plurality of sensors in the mobile device of a user during a trip in a vehicle;
      determining mobile device usage movements from the plurality of movement measurements obtained from the at least one of the plurality of sensors, wherein the mobile device usage movements are movements indicative of the usage of the mobile device by the user based on the plurality of movement measurements;
      determining a time series of usage probabilities over the plurality of time intervals based on a comparison of the plurality of movement measurements to known usage measurements, wherein the usage probabilities include probabilities that the user is using the mobile device over the plurality of time intervals;
      determining that the mobile device is in a mount in the vehicle during the trip by comparing the plurality of movement measurements to known mount measurements;
      determining whether a global positioning system (GPS) application of the mobile device is active;
      flagging a first set of time intervals for which the usage probabilities are greater than a first threshold and a determination is made that the GPS application is active and flagging a second set of time intervals for which the usage probabilities are greater than a second threshold and a determination is made that the GPS application is not active, wherein the first threshold is greater than the second threshold; and
      consolidating the flagged first set of time intervals and the flagged second set of time intervals within a threshold time period into continuous periods of usage to provide filtered mobile device usage movements; and
      outputting the filtered mobile device usage movements.

2. The system of claim 1, wherein the usage of the mobile device by the user includes interaction with the mobile device by the user.

3. The system of claim 1, further comprising:
   extracting the movement measurements corresponding to the plurality of time intervals in which the usage probabilities exceed at least one of the first threshold or the second threshold.

4. The system of claim 1, further comprising:
   classifying the user of the mobile device as a driver of the vehicle on the trip after determining that the mobile device is in the mount.

5. The system of claim 1, further comprising:
   extracting the mobile device usage movements that occurred while a screen of the mobile device was on.

6. The system of claim 1, further comprising:
   determining whether the user of the mobile device is a driver of the vehicle on the trip by comparing the plurality of movement measurements to known driver usage measurements.

7. The system of claim 1, further comprising:
   calculating a score for at least one of the user or the trip using the filtered mobile device usage movements, wherein the outputting the filtered mobile device usage movements includes outputting the score.

8. A method, comprising:
   obtaining a plurality of movement measurements over a plurality of time intervals from at least one of a plurality of sensors in a mobile device of a user during a trip in a vehicle;
   determining mobile device usage movements from the plurality of movement measurements obtained from the at least one of the plurality of sensors, wherein the mobile device usage movements are movements indicative of usage of the mobile device by the user based on the plurality of movement measurements;
   determining a time series of usage probabilities over the plurality of time intervals based on a comparison of the plurality of movement measurements to known usage measurements, wherein the usage probabilities include probabilities that the user is using the mobile device over the plurality of time intervals;
   determining that the mobile device is in a mount in the vehicle during the trip by comparing the plurality of movement measurements to known mount measurements;
   determining whether a global positioning system (GPS) application is active on the mobile device by comparing the obtained plurality of movement measurements to known GPS active data;
   flagging first time intervals for which the usage probabilities are greater than a first threshold and the GPS application is active and flagging second time intervals for which the usage probabilities are greater than a second threshold and the GPS application is inactive or is not present on the mobile device, wherein the first threshold is greater than the second threshold;

consolidating the flagged first time intervals and the flagged second time intervals within a threshold time period into continuous periods of usage to provide filtered mobile device usage movements; and outputting the filtered mobile device usage movements.

9. The method of claim 8, wherein the usage of the mobile device by the user includes interaction with the mobile device by the user.

10. The method of claim 8, further comprising:

extracting the movement measurements corresponding to the plurality of time intervals in which the usage probabilities exceed at least one of the first threshold or the second threshold.

11. The method of claim 8, further comprising:

classifying the user of the mobile device as a driver of the vehicle on the trip after determining that the mobile device is in the mount.

12. The method of claim 8, further comprising:

extracting the mobile device usage movements that occurred while a screen of the mobile device was on.

13. The method of claim 8, further comprising:

determining whether the user of the mobile device is a driver of the vehicle on the trip by comparing the plurality of movement measurements to known driver usage measurements.

14. The method of claim 8, further comprising:

calculating a score for at least one of the user or the trip using the filtered mobile device usage movements, wherein the outputting the filtered mobile device usage movements includes outputting the score.

15. A method for identifying a driver of a vehicle using mobile device usage measurements, the method comprising:

operating one or more sensors of a mobile device of a user to obtain a plurality of movement measurements over a plurality of time intervals, the mobile device disposed in the vehicle during a trip;

determining, by a processor of the mobile device, mobile device usage movements from the plurality of movement measurements obtained from the at least one of the one or more sensors, wherein the mobile device usage movements are movements indicative of usage of the mobile device by the user based on the movement measurements;

determining, by the processor, a time series of usage probabilities over the plurality of time intervals based on a comparison of the obtained plurality of movement measurements to known usage measurements, wherein the usage probabilities include probabilities that the user is using the mobile device over the plurality of time intervals;

determining, by the processor, decelerations, stops, and accelerations of the vehicle based on the plurality of movement measurements;

determining, by the processor, whether the mobile device usage movements begin during a deceleration or a stop in movements of the vehicle and end during the stop or an acceleration in the movements of the vehicle; and in response to determining that the mobile device usage movements begin during the deceleration or the stop in the movements of the vehicle and end during the stop or the acceleration in the movements of the vehicle, classifying, by the processor, the user as the driver of the vehicle.

16. The method of claim 15, wherein the usage of the mobile device by the user includes interaction with the mobile device by the user.

17. The method of claim 15, further comprising:

determining, by the processor, whether the user of the mobile device is the driver of the vehicle during the trip by comparing the obtained plurality of movement measurements to known driver usage measurements.

* * * * *